(12) United States Patent
Wolf et al.

(10) Patent No.: US 6,496,221 B1
(45) Date of Patent: Dec. 17, 2002

(54) IN-SERVICE VIDEO QUALITY MEASUREMENT SYSTEM UTILIZING AN ARBITRARY BANDWIDTH ANCILLARY DATA CHANNEL

(75) Inventors: Stephen Wolf, Longmont, CO (US); Margaret H. Pinson, Boulder, CO (US)

(73) Assignee: The United States of America as represented by the Secretary of Commerce, Washington, DC (US)

( * ) Notice: Subject to any disclaimer, the term of this patent is extended or adjusted under 35 U.S.C. 154(b) by 0 days.

(21) Appl. No.: 09/431,160

(22) Filed: Nov. 1, 1999

Related U.S. Application Data
(60) Provisional application No. 60/106,672, filed on Nov. 2, 1998.

(51) Int. Cl.[7] .......................... H04N 17/00; H04N 17/02
(52) U.S. Cl. ........................................ 348/192; 348/193
(58) Field of Search ................................ 348/180, 181, 348/182, 183, 184, 192, 193, 194; 455/67.1, 67.3, 67.7, 69; H04N 17/00, 17/02

(56) References Cited

U.S. PATENT DOCUMENTS

| | | | |
|---|---|---|---|
| 5,446,492 A | * 8/1995 | Wolf et al. .................. | 348/180 |
| 5,473,361 A | * 12/1995 | Penney ........................ | 725/143 |
| 5,596,364 A | * 1/1997 | Wolf et al. .................. | 348/180 |
| 5,617,137 A | * 4/1997 | Whitlow ...................... | 348/193 |
| 5,940,124 A | * 8/1999 | Janko et al. ................. | 348/180 |
| 5,966,186 A | * 10/1999 | Shigihara et al. ........... | 348/193 |
| 6,075,561 A | * 6/2000 | Janko .......................... | 348/180 |
| 6,219,095 B1 | * 4/2001 | Zhang et al. ................ | 348/192 |
| 6,246,435 B1 | * 6/2001 | Patel ........................... | 348/180 |
| 6,307,839 B1 | * 10/2001 | Gerszberg et al. .......... | 370/235 |

OTHER PUBLICATIONS

Stephen Wolf and Margaret H. Pinson, Spatial–Temporal Distortion Metrics for In–Service Quality Monitoring of Any Digital Video System; SPIE International Symposium on Voice, Video and Data Communications, Boston, MA, Sep. 11–22, 1999.

David Fibush, "ITU–T Draft Recommendation J. OVQ, Objective Measurement Methodologies for Perceptual Video Quality for Digital Cable Television," ANSI T1A1 contribution T1A1.5/99–102, Jul. 28, 1999.

(List continued on next page.)

*Primary Examiner*—John Miller
*Assistant Examiner*—Brian P Yenke
(74) *Attorney, Agent, or Firm*—Stevens, Davis, Miller & Mosher, LLP

(57) ABSTRACT

An apparatus for measuring the quality of a video transmission or storage system when the input and output of the system may be spatially separated, when the apparatus might not have a priori knowledge of the input video, and when there exists an ancillary data channel that can be used by the apparatus. The apparatus makes continuous quality measurements by extracting features from sequences of processed input and output video frames, communicating the extracted features between the input and the output ends using an ancillary data channel of arbitrary and possible variable bandwidth, computing individual video quality parameters from the communicated features that are indicative of the various perceptual dimensions of video quality (e.g., spatial, temporal, color), and finally calculating a composite video quality score by combining the individual video quality parameters. The accuracy of the composite video quality score generated by the apparatus depends on the bandwidth of the ancillary data channel used to communicate the extracted features, with higher capacity ancillary data channels producing greater accuracies than lower capacity ancillary data channels.

20 Claims, 14 Drawing Sheets

OTHER PUBLICATIONS

Margaret H. Pinson and Stephen Wolf, "Medium Bandwidth Techniques for Estimating Temporal Delays between Input and Output Video Sequences," ANSI T1A1 contribution No. T1A1.5/99–205, May 1999.

Margaret H. Pinson and Stephen Wolf, "Low Bandwidth Techniques for Estimating Temporal Delays between Input and Output Video Sequences," ANSI T1A1 contribution No. T1A1.6/99–204, May 1999.

ITU–T Question 22/9 Delayed Contribution D78, "Methodologies for video quality assessment on networks in operation," International Telecommunication Union, Telecommunication Standardization Sector, Boston, Apr. 26–30, 1999.

J. Baina, P. Bretillon, D. Masse, and A. Refik, "Quality of MPEG2 signal on a simulated digital terrestrial television," IEEE Transactions on Broadcasting, vol. 44, No. 4, Dec. 1998.

Stephen Wolf and Margaret H. Pinson, "In–Service Performance Metrics for MPEG–2 Video Systems," Made to Measure 98—Measurement Techniques of the Digital Age Technical Seminar, jointly sponsored by the International Academy of Broadcasting (IAB), the International Telecommunications Union (ITU), and the Technical Univerisyt of Braunschweig (TUB), Montreux, Switzerland, Nov. 12–13, 1998.

Jamal Baina and Philippe Hocquard, "QUOVADIS quality meter for MPEG2 broadcast signals," Made to Measure 98—Measurement Techniques of the Digital Age Technical Seminar, jointly sponsored by the International Academy of Broadcasting (IAB), the International Telecommunications Union (ITU), and the Technical University of Braunschweig (TUB), Montreux, Switzerland, Nov. 12–13, 1998.

Denis Abraham and Philippe Hocquard, "QUOVADIS field trials, first results," Made to Measure 98—Measurement Techniques of the Digital Age Technical Seminar, jointly sponsored by the International Academy of Broadcasting (IAB), the International Telecommunications Union (ITU) and the Technical University of Braunschweig (TUB), Montreux, Switzerland, Nov. 12–13, 1998.

Jurgen Lauterjung, "Recommendations for the usage of an in–band quality–of–service channel," Made to Measure 98–Measurement Techniques of the Digital Age Technical Seminar, jointly sponsored by the International Academy of Broadcasting (IAB), the International Telecommunications Union (ITU), and the Technical University of Braunschweig (TUB), Montreux, Switzerland, Nov. 12–13, 1998.

Charles Fenimore, John Libert, Stephen Wolf, "Perceptual Effects of Noise in Digital Video Compression," $140^{th}$ SMPTE Technical Conference, Pasadena, CA, Oct. 28–31, 1998.

Coleen Jones and D.J. Atkinson, "Development of Opinion–Based Audiovisual Quality Models for Desktop Video–Teleconferencing," $6^{th}$ IEEE International Workshop on Quality of Service, Napa, California, May 18–20, 1998.

S. Olsson, M. Stroppiana, and J. Baina, "Objective methods for assessment of video quality: state of the art." IEEE Transactions on Broadcasting, vol. 43, No. 4, Dec. 1997.

Stephen Wolf, Margaret H. Pinson, Arthur A. Webster, Gregory W. Cermak and E. Paterson Tweedy, "Objective and Subjective Measures of MPEG Video Quality, " $139^{th}$ SMPTE Technical Conference, New York City, Nov. 21–24, 1997.

Stephen Wolf, "Measuring the End–to–End Performance of Digital Video Systems," IEEE Trans. Broadcast, vol. 43, No. 3, pp. 320–328, Sep. 1997.

ITU–T Question 22/9 Delayed Contribution D22, "QUOVADIS first results," International Telecommunication Union, Telecommunication Standardization Sector, Geneva, Apr. 21–25, 1997.

ANSI T1.801.03–1996, "American National Standard for Telecommunications—Digital Transport of One–Way Video Signals—Parameters for Objective Performance Assessment," American National Standards Institute.

* cited by examiner

IN-SERVICE VIDEO QUALITY MEASUREMENT SYSTEM UTILIZING AN ARBITRARY BANDWIDTH ANCILLARY DATA CHANNEL

This application incorporates the subject matter of provisional application serial No. 60/106,672, filed Nov. 2, 1998 the contents of which are hereby incorporated in their entirety, by reference.

BACKGROUND OF THE INVENTION

1. Field of the Invention

This invention relates generally to an apparatus for performing in-service measurements of the quality of a video transmission or storage system. The video may include moving images as well as still images. The video transmission or storage systems may include, but are not limited to, digital video encoders and decoders, video storage/retrieval systems, analog transmission circuits, and digital transmission circuits. The apparatus measures in-service video quality even when the input and output ends of the video transmission system are spatially separated and the input video is not known a priori by the apparatus. Rather than injecting known video signals into the video transmission system and making measurements on these, the apparatus attaches nonintrusively to the input and output ends and makes measurements on the actual program material being sent over the video transmission system. The apparatus makes measurements using actual program material by extracting features indicative of video quality from the input and output ends, communicating these extracted features over an ancillary data channel, and then calculating quality parameters based on the extracted features. The apparatus has the ability to make video quality measurements using ancillary data channels of arbitrary and possibly dynamic bandwidths. In general, the apparatus makes coarser quality measurements, i.e., coarser in the sense that extracted features come from larger spatial-temporal (S-T) regions, when smaller capacity ancillary data channels are available, and finer quality measurements when larger capacity ancillary data channels are available. This makes the apparatus very versatile in that many different types of ancillary data channels may be used by the apparatus. Some examples of ancillary data channels that may be used by the apparatus include modem connections over the Public Switched Telephone Network (PSTN), Internet connections, Local Area Network (LAN) connections, Wide Area Network (WAN) connections, satellite connections, mobile telephone connections, ancillary data channels in modem digital video transmission systems, and data sent over the vertical interval in the analog NTSC video standard.

2. Description of Prior Art

Devices for measuring the video quality of analog video transmission systems have been available for many years. All of these devices utilize standard test patterns or signals (such as a color bar) that are injected into the video system by the measurement apparatus. In these cases, since the measurement apparatus has perfect knowledge of the input test signal, video quality measurements are made by examining distortions in the resultant output from the video transmission system. Further, in-service measurements are made by injecting test signals into only the non-visible portion of the video signal (e.g., the vertical interval in the NTSC video standard) while the visible portion carries the normal program material observed by the viewer.

With the advent of new digital video systems that utilize compression to achieve a savings in transmission or storage bandwidth, the quality of the received output video may be highly dependent upon the inherent spatial and temporal information content of the input video. Thus, it no longer makes sense to make quality measurements using video signals injected by an apparatus, since the resultant quality of these injected signals may not relate at all to the resultant quality of actual program material. Thus, a new method is required to make in-service video quality measurements on actual program material.

Many systems have been developed in recent years to make video quality measurements by comparing input and output video images of actual program material. One such common system computes the mean square error between the input video and output video stream. However, most of these systems require complete knowledge of each and every pixel in the input and output video to work properly, and hence these systems are only practical for the following special cases:

(1) Out-of-service testing when the input video is known perfectly a priori by the apparatus.

(2) In-service testing when the input and output ends are either in the same geographic location or when a high bandwidth ancillary data channel is available to transmit a perfect copy of the input video to the output video end.

It should be noted that in the second case, the ancillary data channel bandwidth required to transmit a perfect copy of the input video is on the order of 270 Mbits/sec for broadcast applications. This sort of extra bandwidth is rarely available between the input and output ends of most common video transmission channels.

An in-service video quality measurement system that uses actual program material and that does not require perfect copies of the input and output video has been developed. This system was first presented in U.S. Pat. No. 5,446,492 issued Aug. 29, 1995, and then updated in U.S. Pat. No. 5,596,364 issued Jan. 21, 1997. However, no mechanism is identified in the apparatus of these patents that enables the apparatus to automatically adapt to increasing ancillary data channel bandwidth with the intent of producing finer, and hence more accurate, measurements of video quality.

SUMMARY OF THE INVENTION

It is accordingly an object of the present invention to provide an improved method and system for performing in-service measurements of the quality of a video transmission or storage system. Here, the video transmission or storage systems may include, but are not limited to, digital video encoders and decoders, video storage/retrieval systems, analog transmission circuits, and digital transmission circuits. The term in-service means that the input and output ends of the video transmission or storage system may be spatially separated, and that the input video to the video transmission or storage system is not known a priori by the video quality measurement system.

Another object of this invention is to provide a method of adjusting the coarseness of the in-service video quality measurements based on the amount of bandwidth that is available in an ancillary data channel, with finer measurements being made for increased ancillary data channel bandwidths.

BRIEF DESCRIPTION OF THE DRAWINGS

Other objects, advantages, and novel features of the subject invention will become apparent from the following detailed description of the invention when considered with the accompanying figures, wherein.

DETAILED DESCRIPTION OF THE PREFERRED EMBODIMENTS

Figure 1:
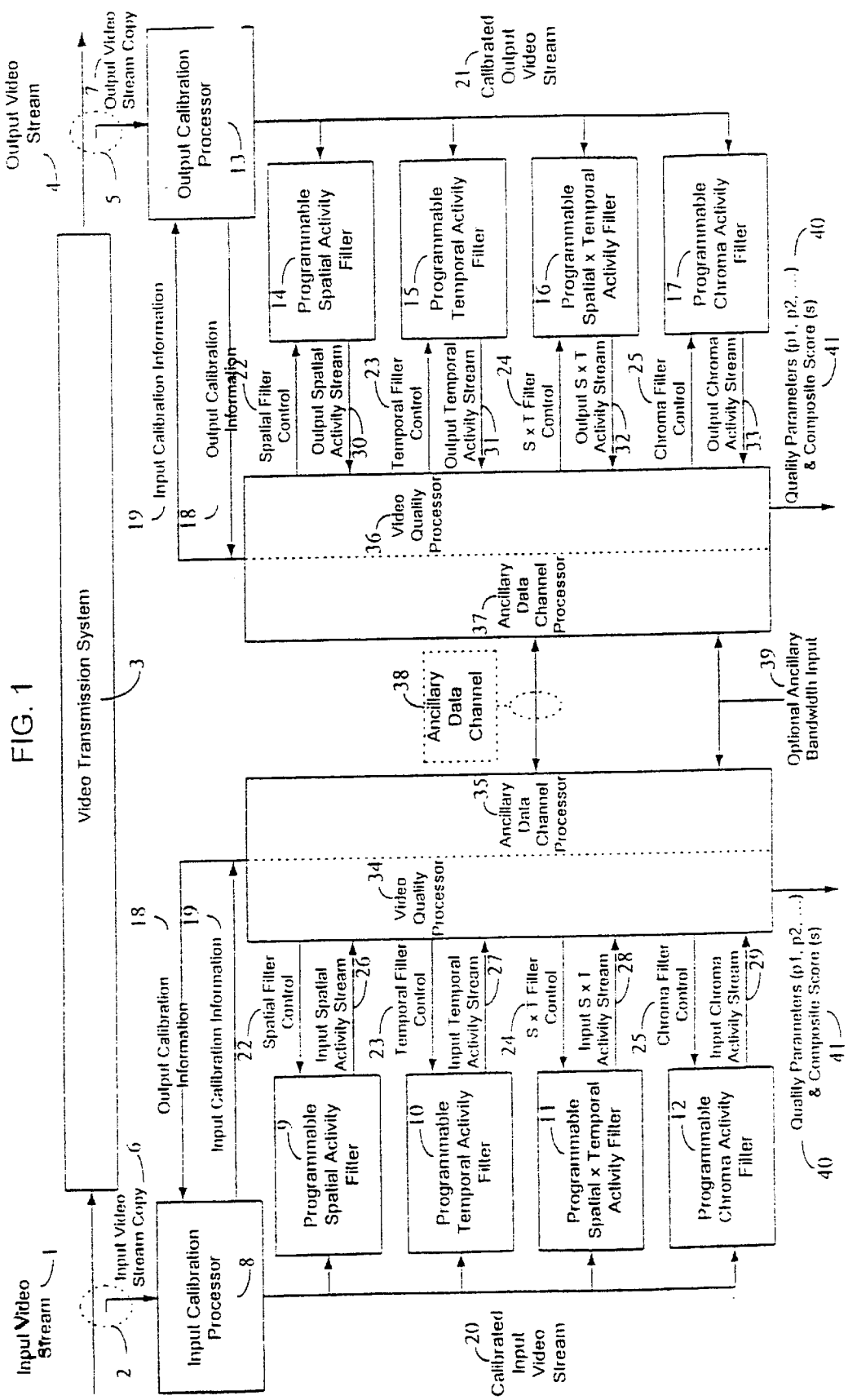
FIG. 1 is an overview block diagram of one embodiment of the invention and demonstrates how the invention is nonintrusively attached to the input and output ends of a video transmission system.

FIG. 1 gives a block diagram of one embodiment of the invention and demonstrates how the invention is nonintrusively attached to the input and output ends of a video transmission system. Referring to FIG. 1, the input calibration processor 8 and output calibration processor 13 are attached nonintrusively to the input and output side of video transmission system 3 using couplers 2 and 5, respectively. Couplers 2 and 5 create copies of input video stream 1 and output video stream 4 and these copies (6, 7) are sent to input calibration processor 8 and output calibration processor 13, respectively. Input video stream 1, its copy 6, output video stream 4, and its copy 7, consist of a plurality of image frames, where each frame includes a plurality of image pixels. Couplers 2 and 5 do not corrupt the normal flow of input video stream 1 or output video stream 4 to and from video transmission system 3.

Figure 2:
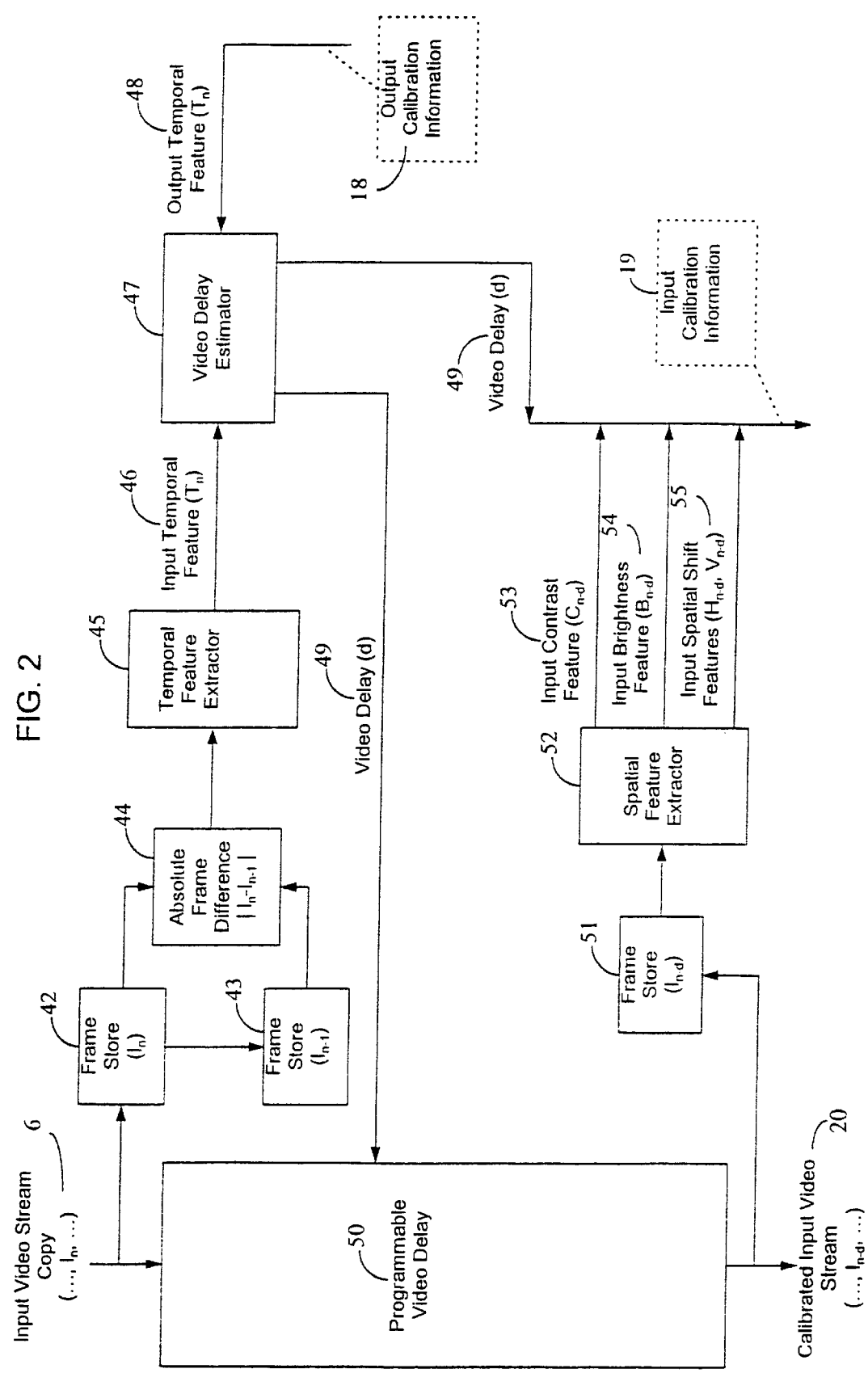
FIG. 2 is a detailed block diagram of one embodiment of the input calibration processor.
Figure 3:
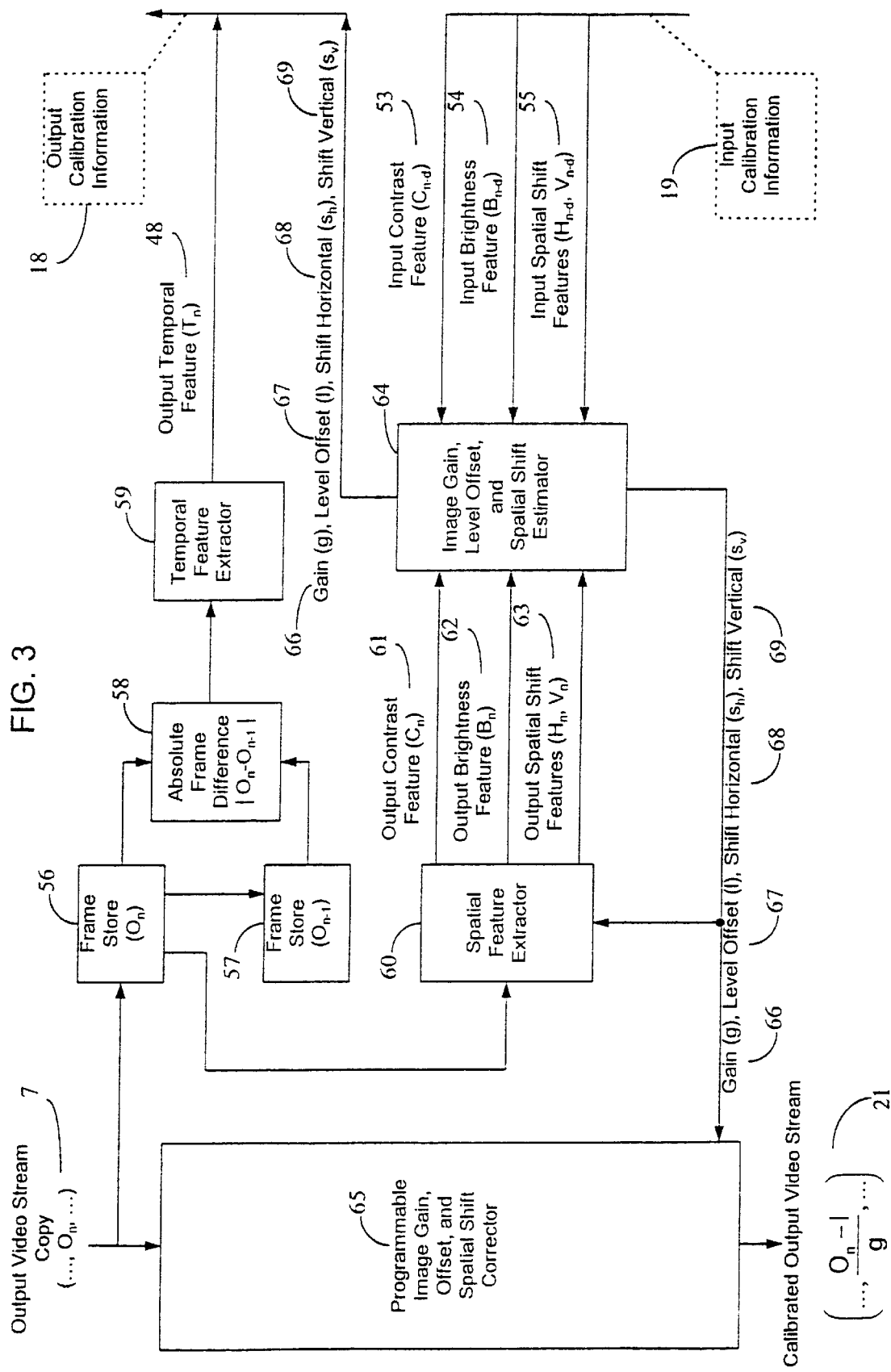
FIG. 3 is a detailed block diagram of one embodiment of the output calibration processor.

FIG. 2 and FIG. 3 present detailed block diagrams of one embodiment of the input calibration processor 8 and the output calibration processor 13, respectively. The function of input calibration processor 8 is to estimate the video delay of video transmission system 3, and to produce a calibrated input video stream 20 from input video stream copy 6 that is time synchronized, or delayed in time to match output video stream copy 7. The function of output calibration processor 13 is to estimate the gain, level offset, and spatial shift of video transmission system 3, and to produce a calibrated output video stream 21 from output video stream copy 7 that is gain adjusted, level shifted, and spatially shifted to match input video stream copy 6.

FIGS. 2 and 3 present a snapshot at time n of properly functioning input and output calibration processors. In FIG. 2, the input video stream copy 6 consists of a time sequence of video frames ( . . . , $I_{n-1}$, $I_n$, $I_{n+1}$, . . . ), where the current input video frame at time n is represented by $I_n$. In FIG. 3, the output video stream copy 7 consists of a time sequence of video frames ( . . . , $O_{n-1}$, $O_n$, $O_{n+1}$, . . . ), where the current output video frame at time n is represented by $O_n$. In FIG. 2, absolute frame difference $|I_n-I_{n-1}|$ 44 computes an image which is the absolute value of the difference between the current (time n) input image stored in frame store ($I_n$) 42 and the previous (time n−1) input image stored in frame store ($I_{n-1}$) 43. In FIG. 3, an identical process is performed in that absolute frame difference $|O_n-O_{n-1}|$ 58 computes an image which is the absolute value of the difference between the current output image stored in frame store ($O_n$) 56 and the previous output image stored in frame store ($O_{n-1}$) 57. Temporal feature extractor 45 extracts input temporal feature ($T_n$) 46 from absolute frame difference 44. Likewise, temporal feature extractor 59 extracts output temporal feature ($T_n$) 48 from absolute frame difference 58. Preferably, the input temporal feature ($T_n$) 46 and the output temporal feature ($T_n$) 48 quantify the amount of motion present in the input and output video streams at time n, respectively. In this preferred embodiment, temporal feature extractors 45 and 59 extract features 46 and 48 using a root mean square calculation over pixels within input and output subregions of the images stored in absolute frame difference $|I_n-I_{n-1}|$ 44 and absolute frame difference $|O_n-O_{n-1}|$ 58, respectively. The output temporal feature ($T_n$) 48 becomes part of the output calibration information 18, that is sent over ancillary data channel 38 in FIG. 1, and arrives at the video delay estimator 47 in FIG. 2.

Preferably, video delay estimator 47 estimates video delay (d) 49 using a time series of input temporal features ($T_n$) 46, denoted ( . . . , $TI_{n-2}$, $TI_{n-1}$, $TI_n$), and a time series of output temporal features ($T_n$) 48, denoted ( . . . , $TO_{n-2}$, $TO_{n-1}$, $TO_n$), wherein these time series may include past as well as present temporal features. In this preferred embodiment where the video delay estimator 47 can remember former input and output temporal features, video delay (d) 49 is calculated by first cross-correlating the output temporal feature series ( . . . , $TO_{n-2}$, $TO_{n-1}$, $TO_n$) with time delayed versions of the input temporal feature series ( . . . , $TI_{n-2-d}$, $TI_{n-1-d}$, $TI_{n-d}$), where d≧0, and then choosing the video delay (d) that achieves the maximum cross-correlation. Preferably, the cross-correlation technique first normalizes the output temporal feature series and each time delayed version of the input temporal feature series so they all have unit standard deviation. Next, the standard deviations of all the difference series are computed, where each difference series is the difference between the normalized output temporal feature series and one normalized time delayed version of the input temporal feature series. Finally, the time delay of the input temporal feature series that produced the difference series with the smallest standard deviation gives video delay (d) 49. This difference series achieves the maximum cross-correlation (i.e., the best match) since the maximum amount of output standard deviation was canceled. Video delay (d) 49 is used by programmable video delay 50 to delay input video stream copy 6 by the same amount as input video stream 1 is delayed by video transmission system 3 in FIG. 1. In this manner, calibrated input video stream 20 from programmable video delay 50 is time synchronized to output video stream copy 7. The video delay (d) 49 also becomes part of input calibration information 19 for ultimate use by video quality processors 34 and 36 in FIG. 1.

An overview of the operation of programmable image gain, offset, and spatial shift corrector 65 in FIG. 3 will now be given. Spatial feature extractor 60 extracts output contrast feature ($C_n$) 61, output brightness feature ($B_n$) 62, and output spatial shift features ($H_n$, $V_n$) 63 from frame store ($O_n$) 56. In a preferably identical manner, spatial feature extractor 52 in FIG. 2 extracts input contrast feature ($C_n$) 53, input brightness feature ($B_n$) 54, and input spatial shift features ($H_n$, $V_n$) 55 from frame store ($I_{n-d}$) 51, wherein the input video frame stored in frame stored in frame store ($I_{n-d}$) 51 is time synchronized to the output video frame stored in frame store ($O_n$) 56 due to the operation of programmable video delay 50. Input contrast feature ($C_{n-d}$) 53, input brightness feature ($B_{n-d}$) 54, and input spatial shift features ($H_{n-d}$, $V_{n-d}$) 55 all become part of input calibration information 19 and are sent over ancillary data channel 38 to arrive at image gain, level offset, and spatial shift estimator 64 in FIG. 3.

In one embodiment, the input spatial shift features ($H_{n-d}$, $V_{n-d}$) 55 are one calibrated input video image $I_{n-d}$ from frame store 51 and the output spatial shift features ($H_n$, $V_n$) 63 are one output video image $O_n$ from frame store 56 that has been corrected for previously known gain (g) 66 and level offset (l) 67. This corrected output image will be denoted as $O_n'$, where $O_n'=[O_n-l]/g$. If gain and level offset are unknown because no previous estimates are available from 64, then gain (g) 66 is set equal to one and level offset (l) 67 is set equal to zero. The time aligned input image $I_{n-d}$ and the output image $O_n'$ are used to calculate shift horizontal ($s_h$) 68 and shift vertical ($s_v$) 69 as follows. First, a computational subregion of calibrated input image $I_{n-d}$ is selected, preferably including only the visible portion and excluding a number of rows and columns around the edge to account for the largest expected horizontal and vertical shift of output image $O_n'$. Next, output image $O_n'$ is shifted with respect to the input image $I_{n-d}$ one pixel at a time, up to the maximum vertical and horizontal shifts that are expected. For each shifted output image, a standard deviation calculation is made using the pixel by pixel differences between the selected subregion of calibrated input image $I_{n-d}$ and the corresponding subregion of the shifted output image. Alternatively, the standard deviation calculation can be made using the pixel by pixel differences between the normalized selected subregion of the calibrated input image $I_{n-d}$ and the normalized corresponding subregion of the shifted output image, where the normalization process produces subregions of unit standard deviation. In either case, the horizontal and vertical shifts where the standard deviation calculation is a minimum provides the shift horizontal ($s_h$) 68 and shift vertical ($s_v$) 69.

In a second embodiment, the input spatial shift features ($H_{n-d}$, $V_{n-d}$) 55 are generated by averaging pixel values across rows (this generates $H_{n-d}$) and across columns (this generates $V_{n-d}$) and the output spatial shift features ($H_n$, $V_n$) 63 are vectors that are generated by first averaging pixel values across rows and across columns, and then correcting these averaged values for previously known gain (g) 66 and level offset (l) 67. These corrected output spatial shift features will be denoted as $H_n'$ and $V_n'$, where $H_n'=[H_n-l]/g$, and $V_n'=[V_n-l]/g$. If gain and level offset are unknown because no previous estimates are available from 64, then gain (g) 66 is set equal to one and level offset (l) 67 is set equal to zero. In this second embodiment, image gain, level offset, and spatial shift estimator 64 estimates the shift horizontal ($s_h$) 68 by cross-correlating output $H_n'$ and input $H_{n-d}$ vectors and selecting the shift horizontal ($s_h$) that gives the maximum cross-correlation. The cross-correlation that is performed uses a fixed central section of the output $H_n'$ vector that is centered within the valid video area (i.e., the valid video area is that part of the output video area that contains real picture as opposed to blanking or black). Also in this second embodiment, 64 estimates the shift vertical ($s_v$) 69 by cross-correlating output $V_n'$ and input $V_{n-d}$ vectors and selecting the shift vertical ($s_v$) that gives the maximum cross-correlation. The cross-correlation that is performed uses a fixed central section of the output $V_n'$ vector that is centered within the valid video area. For both horizontal and vertical shifts, the cross-correlation process computes the standard deviation of the difference between the fixed central output section and the corresponding input section for each possible shift. Alternatively, the cross-correlation process computes the standard deviation of the difference between the normalized fixed central output section and the normalized corresponding input section for each possible shift, where the normalization process produces sections of unit standard deviation. In either case, the shift which produces the section difference with the smallest standard deviation (i.e., maximum cancellation of the output standard deviation) is the correct shift.

Shift horizontal ($s_h$) 68 and shift vertical ($s_v$) 69 are sent back to spatial feature extractor 60 from 64, enabling it to spatially synchronize the extraction of output contrast feature ($C_n$) 61 and output brightness feature ($B_n$) 62 with the extraction of input contrast feature ($C_{n-d}$) 53 and input brightness feature ($B_{n-d}$) 54. Contrast features 53 and 61 are indicative of image contrast and are preferably calculated as the standard deviation over pixels within matched input and output subregions of the images stored in frame store ($I_{n-d}$) 51 and frame store ($O_n$) 56, respectively. Brightness features 54 and 62 are indicative of image brightness and are preferably calculated as the mean over pixels within matched input and output subregions of the images stored in frame store ($I_{n-d}$) 51 and frame store ($O_n$) 56, respectively. The image gain, level offset, and spatial shift estimator 64 calculates the gain (g) 66 of video transmission system 3 as the ratio of output contrast feature ($C_n$) 61 to input contrast feature ($C_{n-d}$) 53, and calculates the level offset (l) 67 as the difference of output brightness feature ($B_n$) 61 and input brightness feature ($B_{n-d}$) 54.

The updated gain (g) 66 and level offset (l) 67 from 64 may then be used by spatial feature extractor 60 to update output spatial shift features ($H_n$, $V_n$) 63 in either the first or second embodiment described above, which in turn can be used by 64 to update shift horizontal ($s_h$) 68 and shift vertical ($s_v$) 69, which in turn can be used by 60 to update the extraction of output contrast feature ($C_n$) 61 and output brightness feature ($B_n$) 62, which in turn can be used by 64 to update gain (g) 66 and level offset (l) 67, and so on and so forth. Eventually, this process will converge and produce unchanging values for gain (g) 66, level offset (l) 67, shift horizontal ($s_h$) 68, and shift vertical ($s_v$) 69. Gain (g) 66, level offset (l) 67, shift horizontal ($s_h$) 68, and shift vertical ($s_v$) 69 are all used by programmable image gain, offset, and spatial shift corrector 65 to calibrate output video stream copy 7 and thereby produce calibrated output video stream 21. Calibrated input video stream 20 and calibrated output video stream 21 are now temporally and spatially synchronized, and equalized with respect to gain and level offset. The gain (g) 66, level offset (l) 67, shift horizontal ($s_h$) 68, and shift vertical ($s_v$) 69 also become part of output calibration information 18 for ultimate use by video quality processors 34 and 36 in FIG. 1.

The above described means for performing input and output calibration may be executed on image fields, instead of image frames, for greater accuracy or when each field requires different calibration corrections. Sub-pixel spatial shifts may also be considered in order to obtain greater spatial alignment accuracy. Intelligent search mechanisms can be utilized to speed convergence.

Some video transmission systems 3 do not transmit every video frame of input video stream 1. Video transmission systems of this type may produce output video streams 4 that contain repeated frames (i.e., output video frames that are identical to previous output video frames) and thus create uncertainty in the estimate of video delay (d) 49. In the preferred embodiment, input calibration processor 8 can detect this uncertain condition by examining the standard deviation of the best matching difference series (i.e., the difference series with the smallest standard deviation). If the standard deviation of the best matching difference series is greater than a predetermined threshold (preferably, this threshold is set to 0.8), then the estimate of video delay (d) 49 is uncertain. In this case, the operation of input calibration processor 8 and output calibration processor 13 is modified such that frame store 43 holds an input frame that is two frames delayed ($I_{n-2}$) and frame store 57 holds an output frame that is two frames delayed ($O_{n-2}$), such that absolute frame difference 44 computes $|I_n - I_{n-2}|$ and absolute frame difference 58 computes $|O_n - O_{n-2}|$. If the standard deviation of the best matching difference series for the modified operation is still greater than a predetermined threshold, then absolute frame differences 44 and 58 can be further modified to hold image $I_n$ and $O_n$, respectively, and temporal feature extractors 45 and 59 can be modified to extract the mean of $I_n$ and $O_n$, respectively. If the standard deviation of the best matching difference series for this further modified operation is still greater than a predetermined threshold, then frame store 43 can be modified again to hold an input frame that is five frames delayed ($I_{n-5}$) and frame store 57 can be modified again to hold an output frame that is five frames delayed ($O_{n-5}$) such that absolute frame difference 44 computes $|I_n - I_{n-5}|$ and absolute frame difference 58 computes $|O_n - O_{n-5}|$.

If video delay is still uncertain after performing all of the above steps, multiple input images (or alternatively, averaged horizontal and vertical profiles from these multiple input images) may be transmitted through ancillary data channel 38 and used by the output calibration process in FIG. 3. In either case, the output calibration process can perform a three dimensional search covering all possible horizontal shifts, vertical shifts, and time shifts, and send the resultant time shift from this search back to the input calibration processor where it can be used for adjusting video delay.

The above described means for generating video delay (d) 49, gain (g) 66, level offset (l) 67, shift horizontal ($s_h$) 68, and shift vertical ($s_v$) 69 are normally performed at least once when the invention is first attached to video transmission system 3. Input calibration processor 8 and output calibration processor 13 may periodically monitor and update calibration quantities 49, 66, 67, 68, and 69 as needed.

Figure 4:
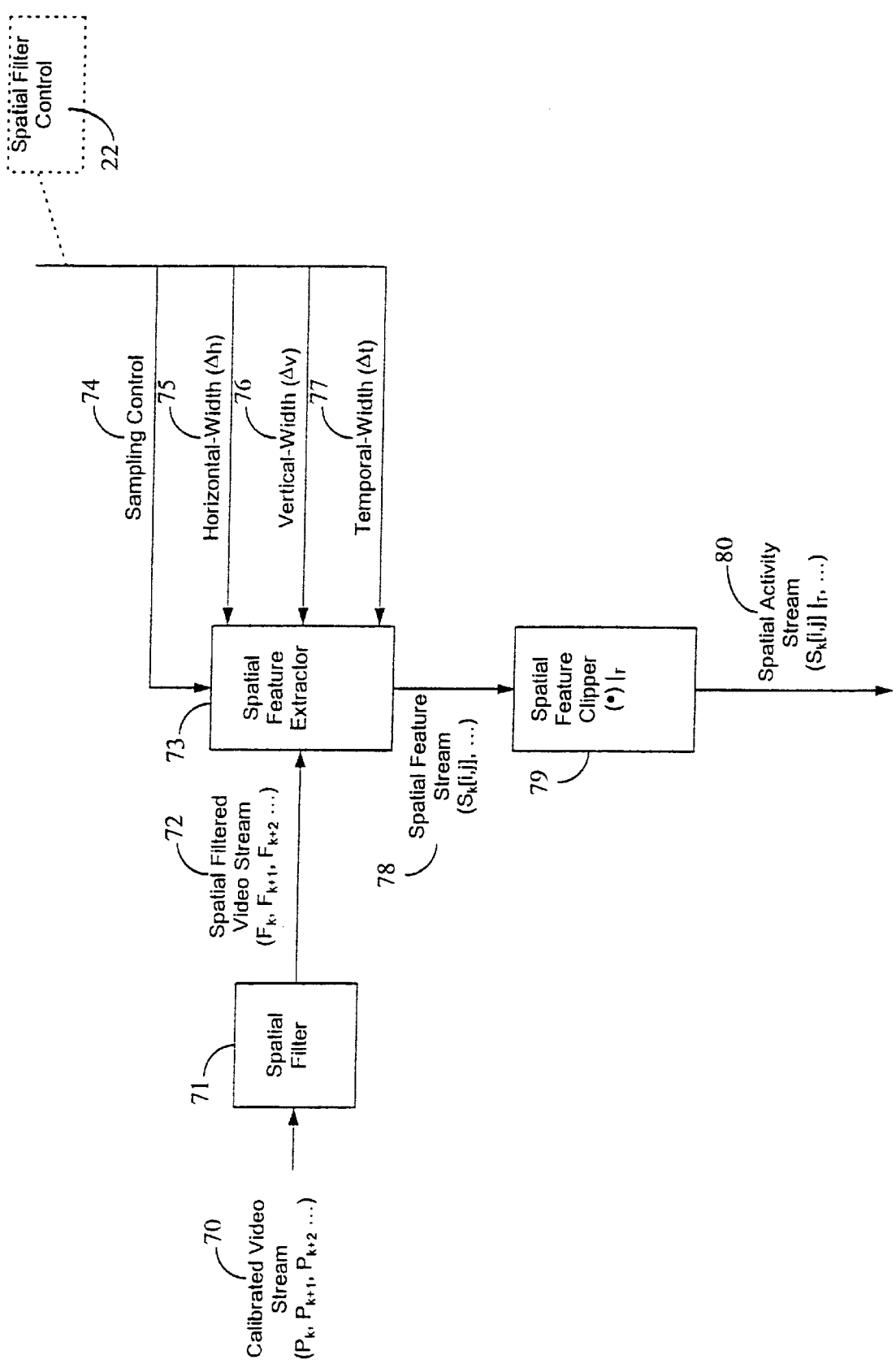
FIG. 4 is a detailed block diagram of one embodiment of the programmable spatial activity filter.

FIG. 4 presents a detailed block diagram of programmable spatial activity filters 9 and 14 shown in FIG. 1. For programmable spatial activity filter 9, calibrated video stream 70 in FIG. 4 is calibrated input video stream 20 in FIGS. 1 and 2, while for programmable spatial activity filter 14, calibrated video stream 70 is calibrated output video stream 21 in FIGS. 1 and 3. Preferably, spatial filter 71 in FIG. 4 spatially filters calibrated video stream 70 with the Sobel filter to enhance edges and spatial detail. Spatial filters 71 other than Sobel may be used, but the selected spatial filter should approximate the perception of edges and spatial detail by the human visual system. Spatial filter 71 is applied to each image in calibrated video stream ($P_k$, $P_{k+1}$, $P_{k+2}$, ...) 70 to produce spatial filtered video stream 72 ($F_k$, $F_{k+1}$, $F_{k+2}$, ...), which is then sent to spatial feature extractor 73. Here, k represents a new time synchronized index for individual images at time k in both the calibrated input video stream 20 and the calibrated output video stream 21.

Figure 8:
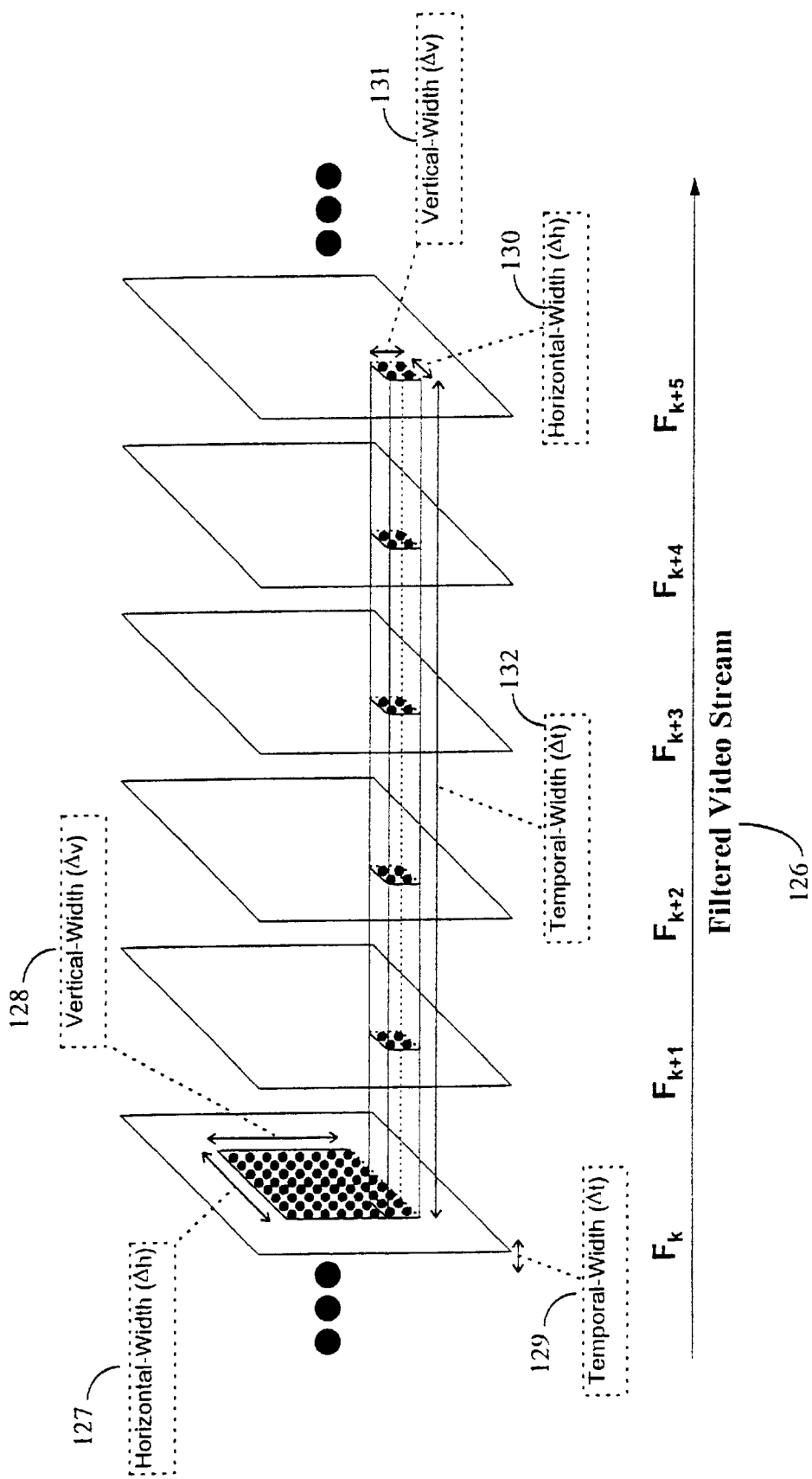
FIG. 8 illustrates two spatial-temporal region sizes from which features may be extracted by the programmable filters in FIG. 4, FIG. 5, FIG. 6, and FIG. 7.

FIG. 8 illustrates two spatial-temporal region sizes that might be used by spatial feature extractor 73 to extract spatial feature stream ($S_k[i,j]$, ...) 78 from spatial filtered video stream ($F_k$, $F_{k+1}$, $F_{k+2}$, ...) 72. For the purpose explaining the operation of spatial feature extractor 73, the diagram in FIG. 8 depicts the spatial filtered video stream ($F_k$, $F_{k+1}$, $F_{k+2}$, ...) 72 as filtered video stream ($F_k$, $F_{k+1}$, $F_{k+2}$, ...) 126. For the first spatial-temporal region size shown in FIG. 8 (8 horizontal pixels×8 vertical pixels×1 frame), horizontal-width ($\Delta h$) 75 in FIG. 4 is equal to horizontal-width ($\Delta h$) 127, vertical-width ($\Delta v$) 76 is equal to vertical-width ($\Delta v$) 128, and temporal-width ($\Delta t$) 77 is equal to temporal width ($\Delta t$) 129. For the second spatial-temporal region size shown in FIG. 8 (2 horizontal pixels×2 vertical pixels×6 frames), horizontal-width ($\Delta h$) 75 in FIG. 4 is equal to horizontal-width ($\Delta h$) 130, vertical-width ($\Delta v$) 76 is equal to vertical-width ($\Delta v$) 131, and temporal-width ($\Delta t$) 77 is equal to temporal width ($\Delta t$) 132. The optimal means for generating spatial filter control 22 in FIG. 4 comprising sampling control 74, horizontal-width ($\Delta h$) 75, vertical-width ($\Delta v$) 76, and temporal-width ($\Delta t$) 77 will be described later. Spatial feature extractor 73 in FIG. 4 divides spatial filtered video stream ($F_k$, $F_{k+1}$, $F_{k+2}$, ...) 72 into spatial-temporal region sizes of dimensions horizontal-width ($\Delta h$) 75×vertical-width ($\Delta v$) 76×temporal-width ($\Delta t$) 77, and extracts a feature from each that is indicative of the perception of edges and spatial detail. Preferably, the feature extracted from each spatial-temporal region is computed as the standard deviation over all pixels contained within that region. Statistics other than the standard deviation may be used, including mean, median and any other statistic that summarizes the spatial information in the spatial-temporal region.

Given that i and j are indices that represent the horizontal and vertical spatial locations of each of the spatial-temporal regions, respectively, then spatial feature stream $(S_k[i,j], \ldots)$ 78 would be represented as $(S_k[i,j], S_{k+1}[i,j], S_{k+2}[i,j], \ldots)$ for the 8×8×1 region size and $(S_{k+6}[i,j], S_{k+6}[i,j], S_{k+12}[i,j], \ldots)$ for the 2×2×6 region size, where k is the frame index previously described that represents the time of the first frame for spatial-temporal regions with the same temporal-width subdivision. The purpose of sampling control 74 is to provide spatial feature extractor 73 with a means for selecting a subset of the total i, j, and k indices, and hence a subset of the total spatial feature stream, 78 in FIG. 4, for sending to spatial feature clipper 79. Sampling control 74 thus provides a means for further reducing the bandwidth of spatial activity stream 80, since this must eventually be sent over ancillary data channel 38 in FIG. 1. Spatial feature clipper $(\bullet)|_T$ 79 clips each feature in spatial feature stream 78 at level T, where T is indicative of the lower limit of perception for the feature, and produces spatial activity stream $(S_k[i,j]|_T, \ldots)$ 80, which will ultimately be used by video quality processors 34 and 36. For programmable spatial activity filter 9, spatial activity stream 80 in FIG. 4 is input spatial activity stream 26 in FIG. 1, while for programmable spatial activity filter 14, spatial activity stream 80 is output spatial activity stream 30 in FIG. 1.

Figure 5:
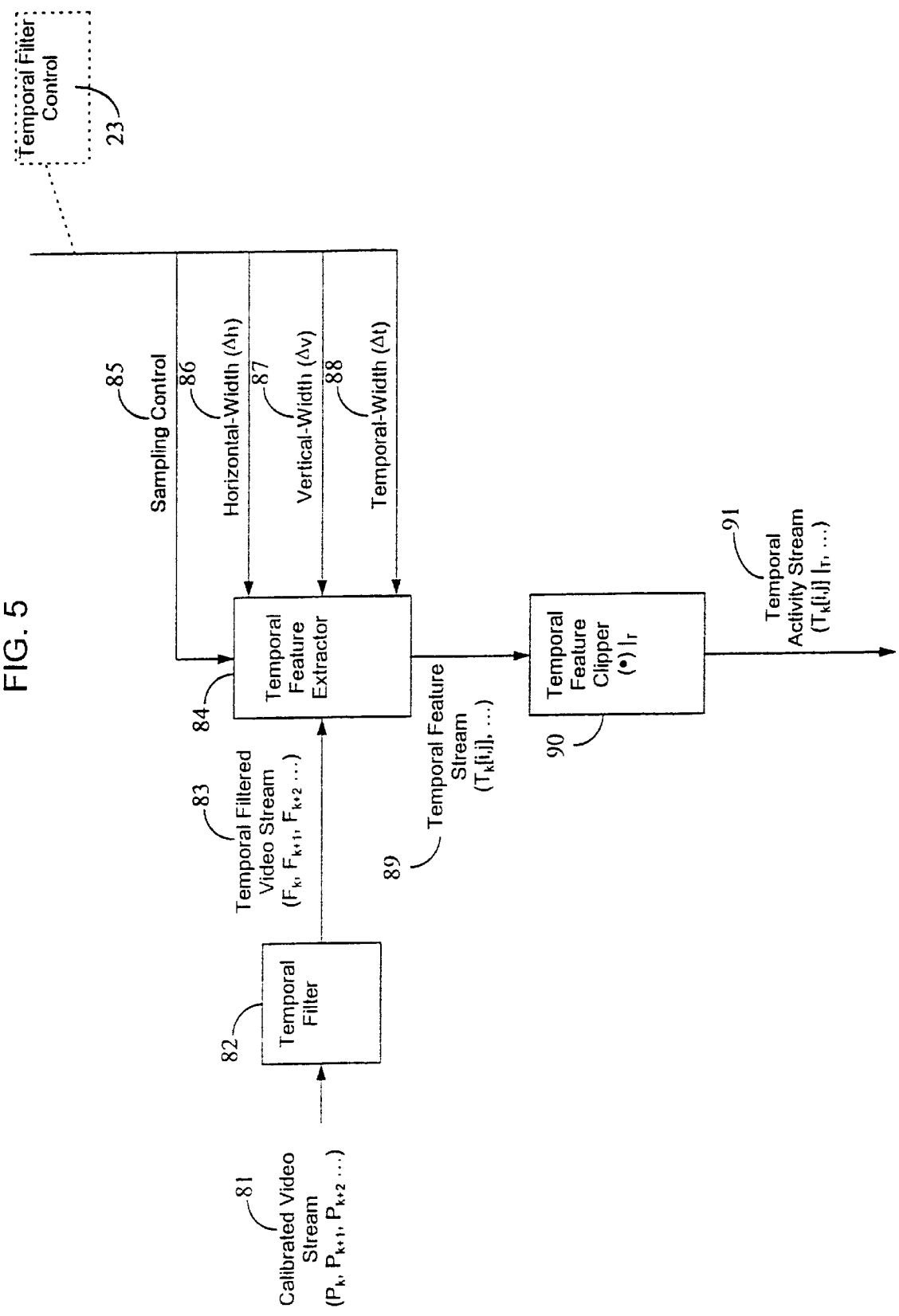
FIG. 5 is a detailed block diagram of one embodiment of the programmable temporal activity filter.

FIG. 5 presents a detailed block diagram of programmable temporal activity filters 10 and 15 shown in FIG. 1. For programmable temporal activity filter 10, calibrated video stream 81 in FIG. 5 is calibrated input video stream 20 in FIGS. 1 and 2, while for programmable temporal activity filter 15, calibrated video stream 81 is calibrated output video stream 21 in FIGS. 1 and 3. Preferably, temporal filter 82 in FIG. 5 temporally filters calibrated video stream 81 with an absolute temporal difference filter to enhance motion and temporal detail. This absolute temporal difference filter computes the absolute value of the current image k and the previous image k−1 (i.e., $|P_k-P_{k-1}|$), for every image k. As previously discussed, k represents the same time synchronized index for individual images that was used to describe the operation of the programmable spatial activity filter in FIG. 4. Temporal filters 82 other than absolute temporal difference may be used, but the selected temporal filter should approximate the perception of motion and temporal detail by the human visual system. Temporal filter 82 is applied to each image in calibrated video stream $(P_k, P_{k+1}, P_{k+2}, \ldots)$ 81 to produce temporal filtered video stream $(F_k, F_{k+1}, F_{k+2}, \ldots)$ 83, which is then sent to temporal feature extractor 84.

FIG. 8 illustrates two spatial-temporal region sizes that might be used by temporal feature extractor 84 to extract temporal feature stream $(T_k[i,j], \ldots)$ 89 from temporal filtered video stream $(F_k, F_{k+1}, F_{k+2}, \ldots)$ 83. For the purpose of explaining the operation of temporal feature extractor 84, the diagram in FIG. 8 depicts the temporal filtered video stream $(F_k, F_{k+1}, F_{k+2}, \ldots)$ 83 as filtered video stream $(F_k, F_{k+1}, F_{k+2}, \ldots)$ 126. For the first spatial-temporal region size shown in FIG. 8 (8 horizontal pixels×8 vertical pixels×1 frame), horizontal-width ($\Delta h$) 86 in FIG. 5 is equal to horizontal-width ($\Delta h$) 127, vertical-width ($\Delta v$) 87 is equal to vertical-width ($\Delta v$) 128, and temporal-width ($\Delta t$) 88 is equal to temporal width ($\Delta t$) 129. For the second spatial-temporal region size shown in FIG. 8 (2 horizontal pixels×2 vertical pixels×6 frames), horizontal-width ($\Delta h$) 86 in FIG. 5 is equal to horizontal-width ($\Delta h$) 130, vertical-width ($\Delta v$) 87 is equal to vertical-width ($\Delta v$) 131, and temporal-width ($\Delta t$) 88 is equal to temporal width ($\Delta t$) 132. The optimal means for generating temporal filter control 23 in FIG. 5 comprising sampling control 85, horizontal-width ($\Delta h$) 86, vertical-width ($\Delta v$) 87, and temporal-width ($\Delta t$) 88 will be described later. Temporal feature extractor 84 in FIG. 5 divides temporal filtered video stream $(F_k, F_{k+1}, F_{k+2}, \ldots)$ 83 into spatial-temporal region sizes of dimensions horizontal-width ($\Delta h$) 86×vertical-width ($\Delta v$) 87×temporal-width ($\Delta t$) 88, and extracts a feature from each that is indicative of the perception of motion and temporal detail. Preferably, the feature extracted from each spatial-temporal region is computed as the standard deviation over all pixels contained within that region. Statistics other than the standard deviation may be used, including mean, median and any other statistic that summarizes the temporal information in the spatial-temporal region.

Given that i and j are indices that represent the horizontal and vertical spatial locations of each of the spatial-temporal regions, respectively, then temporal feature stream $(T_k[i,j], \ldots)$ 89 would be represented as $(T_k[i,j], T_{k+1}[ij], T_{k+2}[ij], \ldots)$ for the 8×8×1 region size and $(T_k[i,j], T_{k+6}[i,j], T_{k+12}[i,j], \ldots)$ for the 2×2×6 region size, where k is the frame index previously described that represents the time of the first frame for spatial-temporal regions with the same temporal-width subdivision. The purpose of sampling control 85 is to provide temporal feature extractor 84 with a means for selecting a subset of the total i, j, and k indices, and hence a subset of the total temporal feature stream, 89 in FIG. 5, for sending to temporal feature clipper 90. Sampling control 85 thus provides a means for further reducing the bandwidth of temporal activity stream 91, since this must eventually be sent over ancillary data channel 38 in FIG. 1. Temporal feature clipper $(\bullet)|_T$ 90 clips each feature in temporal feature stream 89 at level T, where T is indicative of the lower limit of perception for the feature, and produces temporal activity stream $(T_k[i,j]|_T, \ldots)$ 91, which will ultimately be used by video quality processors 34 and 36. For programmable temporal activity filter 10, temporal activity stream 91 in FIG. 5 is input temporal activity stream 27 in FIG. 1, while for programmable temporal activity filter 15, temporal activity stream 80 is output temporal activity stream 31 in FIG. 1.

Figure 6:
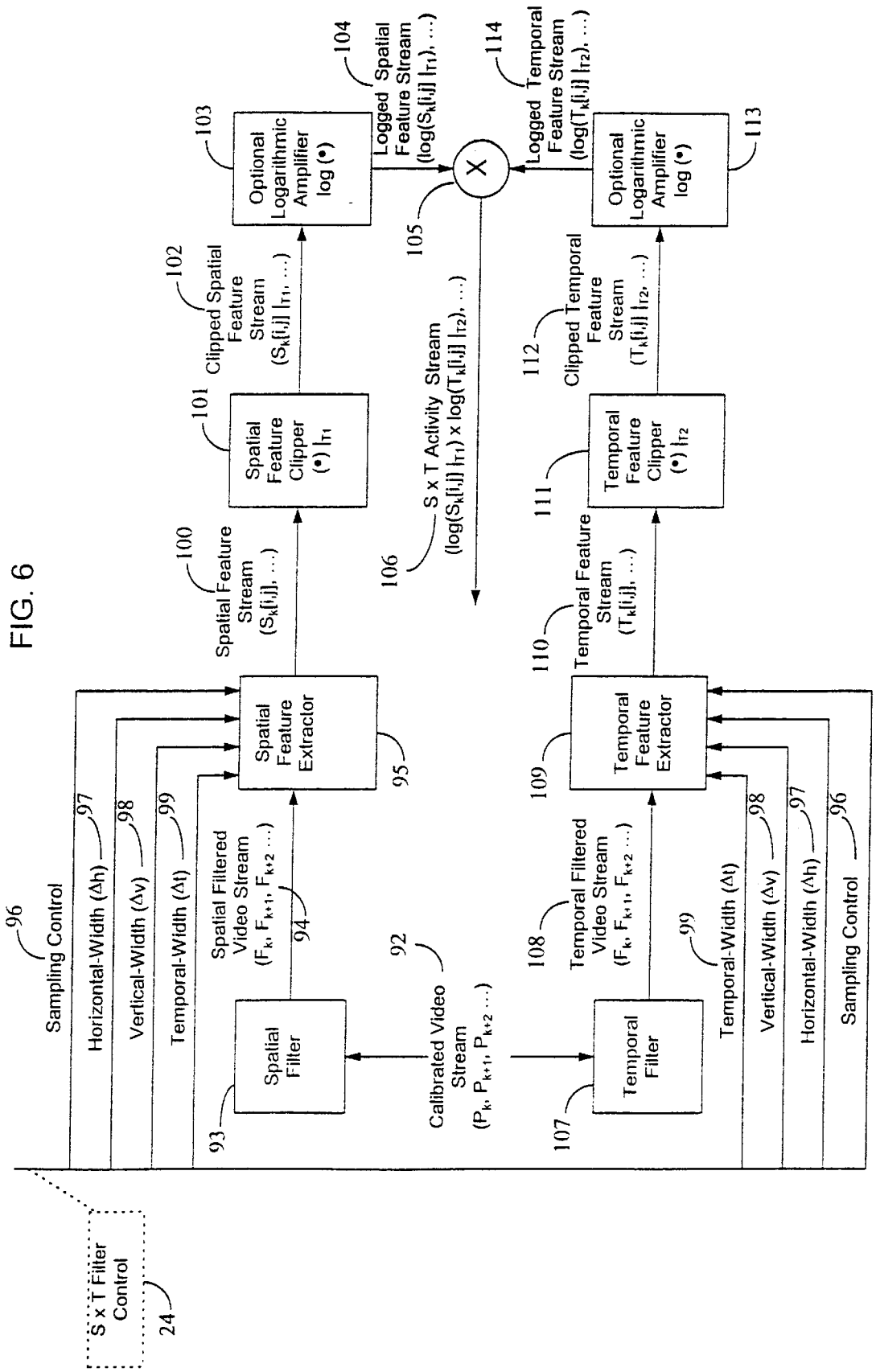
FIG. 6 is a detailed block diagram of one embodiment of the programmable spatial-temporal activity filter.

FIG. 6 presents a detailed block diagram of programmable spatial×temporal activity filters 11 and 16 shown in FIG. 1. For programmable spatial×temporal activity filter 11, calibrated video stream 92 in FIG. 6 is calibrated input video stream 20 in FIGS. 1 and 2, while for programmable spatial activity filter 16, calibrated video stream 92 is calibrated output video stream 21 in FIGS. 1 and 3. To produce spatial filtered video stream 94, spatial filter 93 in FIG. 6 should perform the same kind of filtering on calibrated video stream 92 as spatial filter 71 in FIG. 4 performs on calibrated video stream 70. To produce temporal filtered video stream 108, temporal filter 107 in FIG. 6 should perform the same kind of filtering on calibrated video stream 92 as temporal filter 82 in FIG. 5 performs on calibrated video stream 81. To produce spatial feature stream 100, spatial feature extractor 95 should perform the same type of feature extraction on spatial filtered video stream 94 as spatial feature extractor 73 performs on spatial filtered video stream 72. To produce temporal feature stream 110, temporal feature extractor 109 should perform the same type of feature extraction on temporal filtered video stream 108 as temporal feature extractor 84 performs on temporal filtered video stream 83. However, the feature extraction performed by 95 and 109 are both controlled by S×T filter control 24, itself comprising sampling control 96, horizontal-width ($\Delta h$) 97, vertical-width ($\Delta v$) 98, and temporal-width ($\Delta t$) 99, which may be different than either spatial filter control 22 and its components (74, 75, 76, 77) or temporal filter control 23 and its components (85, 86, 87, 88). The optimal means for generating S×T filter control 24 will be described later.

Spatial feature clipper $(\bullet)|_{T1}$ 101 clips each feature in spatial feature stream 100 at level T1, where T1 is indicative of the lower limit of perception for the feature, and produces clipped spatial feature stream $(S_k[i,j]|_{T1}, \ldots)$ 102. Temporal feature clipper $(\bullet)|_{T2}$ 111 clips each feature in temporal feature stream 110 at level T2, where T2 is indicative of the lower limit of perception for the feature, and produces clipped temporal feature stream $(T_k[i,j]|_{T2}, \ldots)$ 112. Optional logarithmic amplifier 103 computes the logarithm of clipped spatial feature stream 102 and produces logged spatial feature stream $(\log(S_k[i,j]|_{T1}), \ldots)$ 104. Optional logarithmic amplifier 113 computes the logarithm of clipped temporal feature stream 112 and produces logged temporal feature stream $(\log(T_k[i,j]|_{T2}), \ldots)$ 114. Preferably, optional logarithmic amplifiers 103 and 113 are included if a wide range of video transmission system 3 quality is to be measured. Multiplier 105 multiplies logged spatial feature stream 104 and logged temporal feature stream 114 to produce S×T activity stream 106, which will ultimately be used by video quality processors 34 and 36. For programmable spatial×temporal activity filter 11 in FIG. 1, S×T activity stream 106 in FIG. 6 is input S×T activity stream 28, while for programmable spatial×temporal activity filter 16, S×T activity stream 106 is output S×T activity stream 32.

Figure 7:
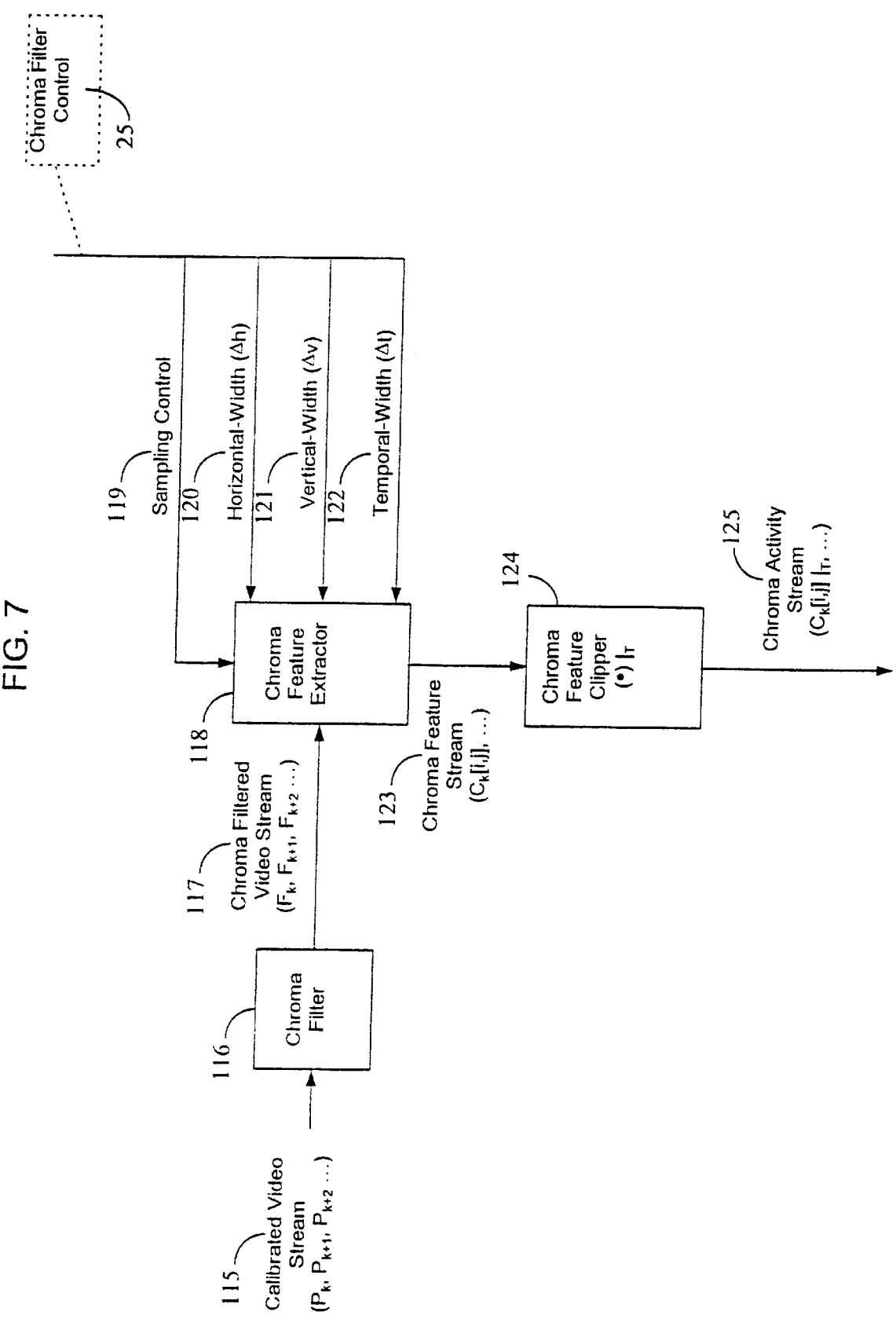
FIG. 7 is a detailed block diagram of one embodiment of the programmable chroma activity filter.

FIG. 7 presents a detailed block diagram of programmable chroma activity filters 12 and 17 shown in FIG. 1. For programmable chroma activity filter 10, calibrated video stream 115 in FIG. 7 is calibrated input video stream 20 in FIGS. 1 and 2, while for programmable chroma activity filter 17, calibrated video stream 115 is calibrated output video stream 21 in FIGS. 1 and 3. Preferably, chroma filter 116 in FIG. 7 chromatically filters calibrated video stream 115 with a saturation filter (i.e., a filter that computes color saturation). Chroma filters 116 other than saturation may be used, including hue (i.e., a filter that computes color hue), but the selected chroma filter should approximate the perception of color by the human visual system. Chroma filter 116 is applied to each image in calibrated video stream $(P_k, P_{k+1}, P_{k+2}, \ldots)$ 115 to produce chroma filtered video stream $(F_k, F_{k+1}, F_{k+2}, \ldots)$ 117, which is then sent to chroma feature extractor 118. As previously discussed, k represents the same time synchronized index for individual images that was used to describe the operation of the programmable spatial activity filter in FIG. 4.

FIG. 8 illustrates two spatial-temporal region sizes that might be used by chroma feature extractor 118 to extract chroma feature stream $(C_k[i,j], \ldots)$ 123 from chroma filtered video stream $(F_k, F_{k+1}, F_{k+2}, \ldots)$ 117. For the purpose of explaining the operation of chroma feature extractor 118, the diagram in FIG. 8 depicts the chroma filtered video stream $(F_k, F_{k+1}, F_{k+2}, \ldots)$ 117 as filtered video stream $(F_k, F_{k+1}, F_{k+2}, \ldots)$ 126. For the first spatial-temporal region size shown in FIG. 8 (8 horizontal pixels×8 vertical pixels×1 frame), horizontal-width ($\Delta h$) 120 in FIG. 7 is equal to horizontal-width ($\Delta h$) 127, vertical-width ($\Delta v$) 121 is equal to vertical-width ($\Delta v$) 128, and temporal-width ($\Delta t$) 122 is equal to temporal-width ($\Delta t$) 129. For the second spatial-temporal region size shown in FIG. 8 (2 horizontal pixels×2 vertical pixels×6 frames), horizontal-width ($\Delta h$) 120 in FIG. 7 is equal to horizontal-width ($\Delta h$) 130, vertical-width ($\Delta v$) 121 is equal to vertical-width ($\Delta v$) 131, and temporal-width ($\Delta t$) 122 is equal to temporal width ($\Delta t$) 132. The optimal means for generating chroma filter control 25 in FIG. 7 comprising sampling control 119, horizontal-width ($\Delta h$) 120, vertical-width ($\Delta v$) 121, and temporal-width ($\Delta t$) 122 will be described later. Chroma feature extractor 118 in FIG. 7 divides chroma filtered video stream $(F_k, F_{k+1}, F_{k+2}, \ldots)$ 117 into spatial-temporal region sizes of dimensions horizontal-width ($\Delta h$) 120×vertical-width ($\Delta v$) 121×temporal-width ($\Delta t$) 122, and extracts a feature from each that is indicative of the perception of color detail. Preferably, the feature extracted from each spatial-temporal region is computed as the standard deviation over all pixels contained within that region. Statistics other than the standard deviation may be used, including mean, median and any other statistic that summarizes the chroma information in the spatial-temporal region.

Given that i and j are indices that represent the horizontal and vertical spatial locations of each of the spatial-temporal regions, respectively, then chroma feature stream $(C_k[i,j], \ldots)$ 123 would be represented as $(C_k[i,j], C_{k+1}[i,j], C_{k+2}[i,j], \ldots)$ for the 8×8×1 region size and $(C_k[i,j], C_{k+6}[i,j], C_{k+12}[i,j], \ldots)$ for the 2×2×6 region size, where k is the frame index previously described that represents the time of the first frame for spatial-temporal regions with the same temporal-width subdivision. The purpose of sampling control 119 is to provide chroma feature extractor 118 with a means for selecting a subset of the total i, j, and k indices, and hence a subset of the total chroma feature stream, 123 in FIG. 7, for sending to chroma feature clipper 124. Sampling control 119 thus provides a means for further reducing the bandwidth of chroma activity stream 125, since this must eventually be sent over ancillary data channel 38 in FIG. 1. Chroma feature clipper $(\bullet)|_T$ 124 clips each feature in chroma feature stream 123 at level T, where T is indicative of the lower limit of perception for the feature, and produces chroma activity stream $(C_k[i,j]|_T, \ldots)$ 125, which will ultimately be used by video quality processors 34 and 36. For programmable chroma activity filter 12, chroma activity stream 125 in FIG. 7 is input chroma activity stream 29 in FIG. 1, while for programmable chroma activity filter 17, chroma activity stream 125 is output chroma activity stream 33 in FIG. 1.

Figure 9:
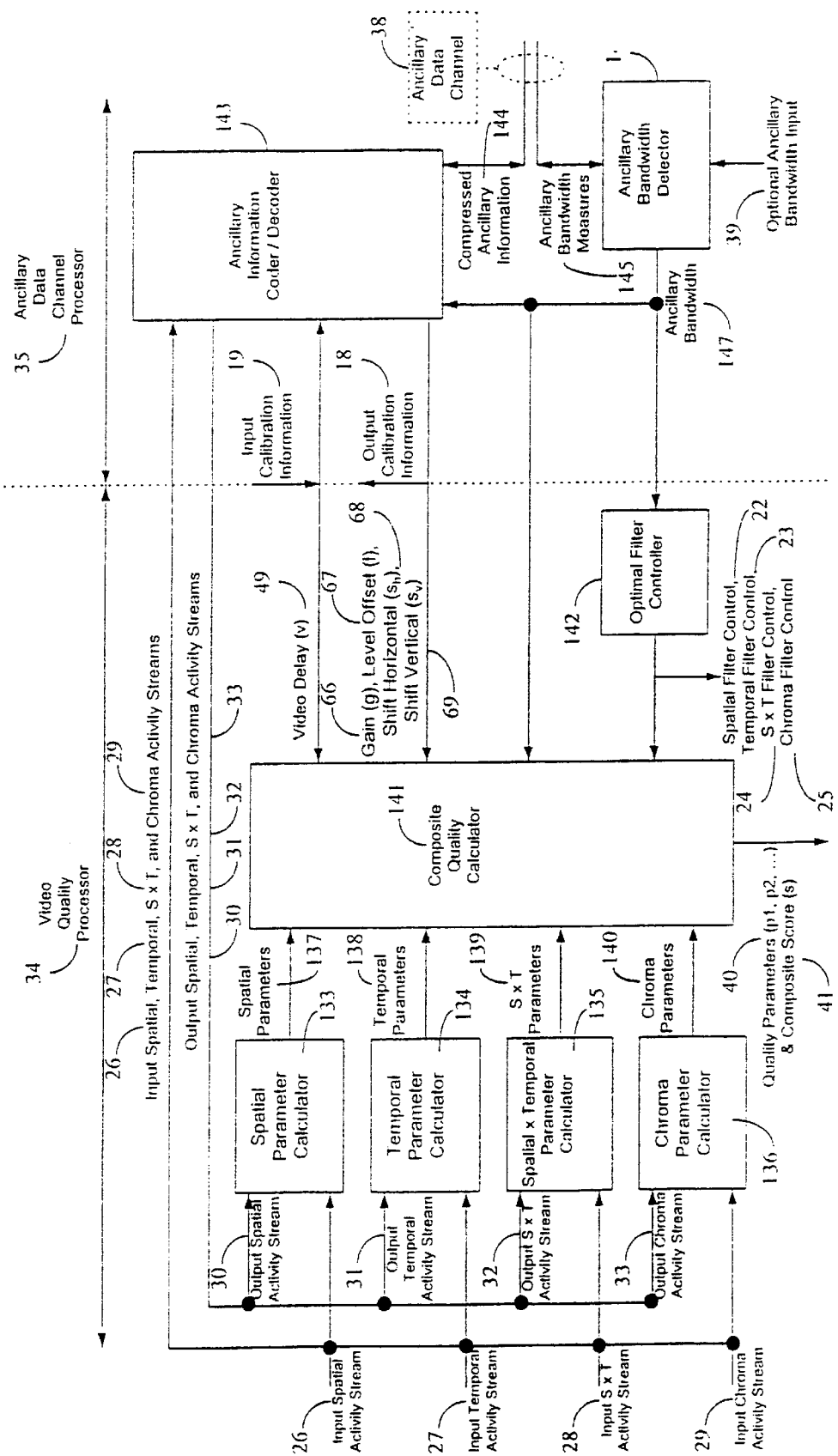
FIG. 9 is a detailed block diagram of one embodiment of the video quality processor and the ancillary data channel processor that is associated with the input side of the video transmission system.
Figure 10:
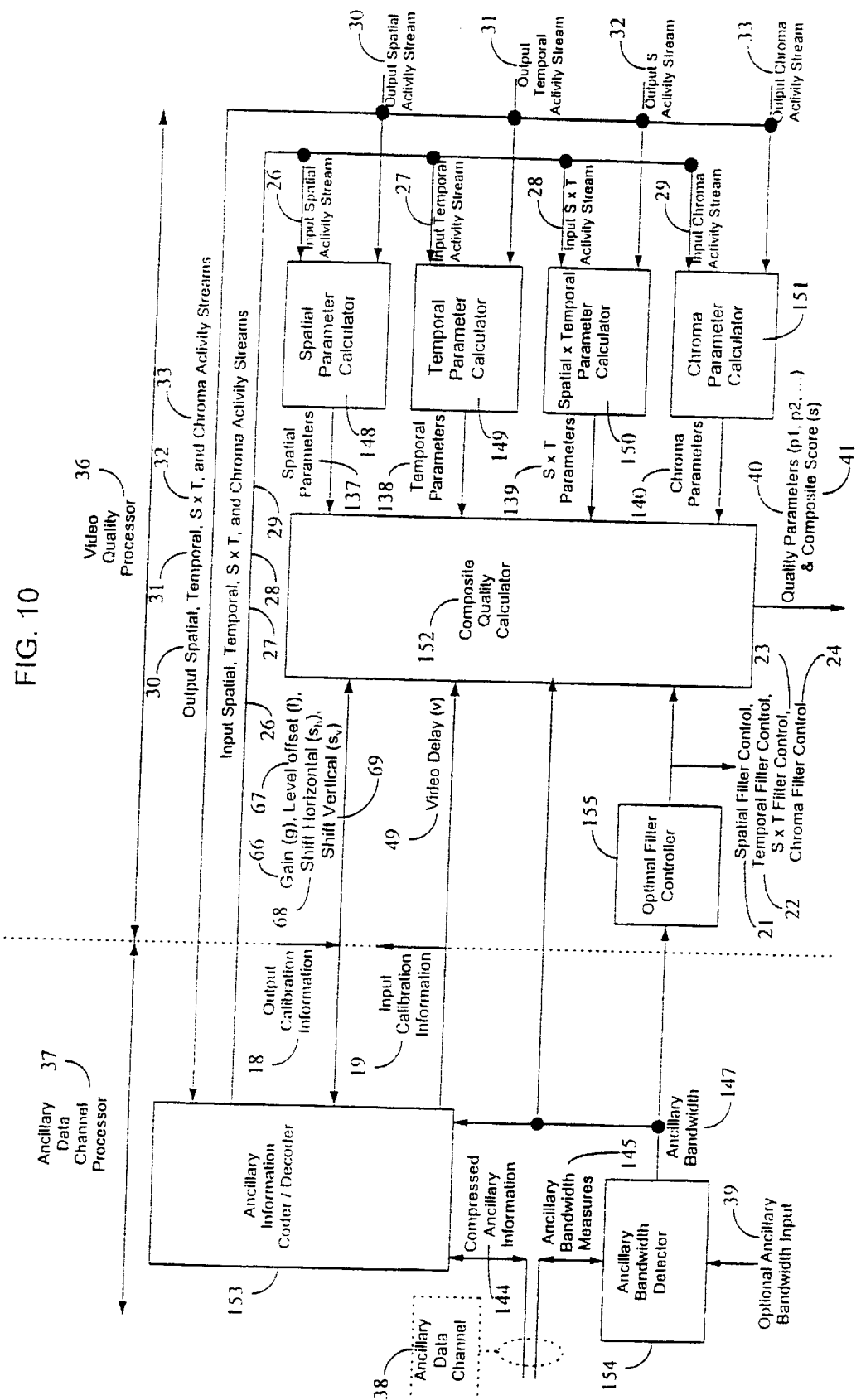
FIG. 10 is a detailed block diagram of one embodiment of the video quality processor and the ancillary data channel processor that is associated with the output side of the video transmission system.

FIG. 9 presents a detailed block diagram of one embodiment of video quality processor 34 and ancillary data channel processor 35 that is associated with the input side of video transmission system 3, while FIG. 10 presents a detailed block diagram of video quality processor 36 and ancillary data channel processor 37 that is associated with the output side of video transmission system 3 for the same embodiment. In FIG. 9, the input spatial (26), temporal (27), S×T (28), and chroma (29) activity streams from programmable filters 9, 10, 11, and 12, respectively, are sent to spatial parameter calculator 133, temporal parameter calculator 134, spatial×temporal calculator 135, and chroma parameter calculator 136, respectively, as well as to ancillary information coder/decoder 143. Ancillary information coder/decoder 143 compresses these activity streams (26, 27, 28, and 29) as well as the input calibration information 19 from input calibration processor 8 in FIG. 1 and produces input to output compressed ancillary information, which becomes part of the total compressed ancillary information 144 that is sent over ancillary data channel 38, to arrive at ancillary information coder/decoder 153 in FIG. 10. Similarly, in FIG. 10, the output spatial (30), temporal (31), S×T (32), and chroma (33) activity streams from programmable filters 14, 15, 16, and 17, respectively, are sent to spatial parameter calculator 148, temporal parameter calculator 149, spatial×temporal calculator 150, and chroma parameter calculator 151, respectively, as well as to ancillary information coder/decoder 153. Ancillary information coder/decoder 153 compresses these activity streams (30, 31, 32, and 33) as well as the output calibration information 18 from output calibration processor 13 in FIG. 1 and produces output to input compressed ancillary information, which becomes part of the total compressed ancillary information 144 that is sent over ancillary data channel 38, to arrive at ancillary information coder/decoder 143 in FIG. 9. Ancillary information coder/decoders 143 and 153 assure that compressed ancillary information 144 does not exceed ancillary bandwidth 147 produced by ancillary bandwidth detectors 146 and 154. Ancillary information coder/decoder 153 decompresses the input spatial (26), temporal (27), S×T (28), and chroma (29) activity streams and sends them to spatial parameter calculator 148, temporal parameter calculator 149, spatial×temporal calculator 150, and chroma parameter calculator 151, respectively. Similarly, ancillary information coder/decoder 143 decompresses the output spatial (30), temporal (31), S×T (32), and chroma (33) activity streams and sends them to spatial parameter calculator 133, temporal parameter calculator 134, spatial×temporal calculator 135, and chroma parameter calculator 136, respectively. Ancillary information coder/decoder 153 decompresses input calibration information 19 and sends it to output calibration processor 13 and composite quality calculator 152. Similarly, ancillary information coder/decoder 143 decompresses output calibration information 18 and sends it to input calibration processor 8 and composite quality calculator 141.

Now a description of the preferred operation of spatial parameter calculators (133, 148), temporal parameter calculators (134, 149), spatial×temporal parameter calculators (135, 150) and chroma parameter calculators (136, 151) will be given. Let $f_{in}(i,j,k)$ represents a particular component of the input activity stream (26, 27, 28, or 29) and $f_{out}(i,j,k)$ represents the corresponding component of the output activity stream (30, 31, 32, or 33), where i, j, and k have been previously described and are indices that represent the horizontal, vertical, and temporal positions of the spatial-temporal region from which the particular components of activity were extracted. Preferably, the calculation performed by parameter calculators (133 and 148, 134 and 149, or 136 and 151) utilizes at least one of the following four equations:

$$gain_{\log}(i, j, k) = pp\left\{\log_{10}\left[\frac{f_{out}(i, j, k)}{f_{in}(i, j, k)}\right]\right\}$$

$$loss_{\log}(i, j, k) = np\left\{\log_{10}\left[\frac{f_{out}(i, j, k)}{f_{in}(i, j, k)}\right]\right\}$$

$$gain_{ratio}(i, j, k) = pp\left\{\frac{f_{out}(i, j, k) - f_{in}(i, j, k)}{f_{in}(i, j, k)}\right\}$$

$$loss_{ratio}(i, j, k) = np\left\{\frac{f_{out}(i, j, k) - f_{in}(i, j, k)}{f_{in}(i, j, k)}\right\}$$

In the above four equations, pp is the positive part operator (i.e., negative values are replaced with zero), np is the negative part operator (i.e., positive values are replaced with zero). These four equations also apply for spatial×temporal parameter calculators 135 and 150 provided optional logarithmic amplifiers 103 and 113 in FIG. 6 were omitted in the generation of the S×T activity streams 28 and 32. If optional logarithmic amplifiers 103 and 113 in FIG. 6 were included, then the preferred method of generating S×T gain and loss parameters is simply:

$$gain_{S\times T}(i,j,k)=pp\{f_{out}(i,j,k)-f_{in}(i,j,k)\}$$

$$loss_{S\times T}(i,j,k)=np\{f_{out}(i,j,k)-f_{in}(i,j,k)\}$$

Video transmission system 3 can introduce a gain in temporal activity (e.g., error blocks) or a loss in temporal activity (e.g., frame repeats), a gain in spatial activity (e.g., edge noise) or a loss in spatial activity (e.g., blurring), a gain in S×T activity (e.g., mosquito noise in the stationary background around moving objects) or a loss in S×T activity (e.g., momentary blurring of a moving object), a gain in chroma activity (e.g., cross color—added color artifacts on white backgrounds next to black edges) or a loss in chroma activity (e.g., color sub-sampling). Preferably, gain and loss are examined separately since they produce fundamentally different effects on quality perception. The above preferred equations for calculating gain and loss of a particular component of the activity streams, i.e., $f_{in}(i, j, k)$ and corresponding $f_{out}(i, j, k)$, have been determined to produce optimal measurement results. This is true because the perceptibility of video impairments in the output video stream 4 is inversely proportional to the amount of activity in the input video stream 1. For example, spatial impairments become less visible as the spatial activity in the input scene is increased (i.e., spatial masking), and temporal impairments become less visible as the temporal activity in the input scene is increased (i.e., temporal masking). S×T parameters measure changes in the cross product of spatial and temporal activity. These parameters allow one to account for relative impairment masking (i.e., reduced visibility of impairments) in areas of high spatial and temporal activity versus areas of low spatial and temporal activity. Secondary masking effects measured by the S×T parameters cannot be explained by either pure spatial masking (i.e., reduced sensitivity to spatial impairments in areas of high spatial activity) or pure temporal masking (i.e., reduced sensitivity to temporal impairments in areas of high temporal activity). S×T parameters enable the invention to impose more severe penalties for impairments that occur in localized spatial-temporal regions of the input scene that have little motion (e.g., still background) and few edges (e.g., constant luminance) relative to those regions that have high motion and many edges.

Spatial parameters 137, temporal parameters 138, S×T parameters 139, and chroma parameters 140 calculated as described above are sent to composite quality calculators 141 and 152. Composite quality calculators 141 and 152 also receive video delay (v) 49, gain (g) 66, level offset (67), shift horizontal ($s_h$) 68, and shift vertical ($s_v$) 69. Using some or all of this information (137, 138, 139, 140, 49, 66, 67, 68, 69), composite quality calculators 141 and 152 produce quality parameters (p1, p2, . . . ) 40, where each individual parameter is indicative of distortion in some perceptual dimension of video quality (e.g., blurring, unnatural motion), and composite score (s) 41, which is indicative of the overall impression of video quality. The preferred means for how information (137, 138, 139, 140, 49, 66, 67, 68, 69) is used by composite quality calculators 141 and 152 will be described later and is based on the available ancillary bandwidth 147 from ancillary bandwidth detectors 146 and 154, respectively.

A description of the preferred method for determining ancillary bandwidth 147 in FIGS. 9 and 10 will now be given. Ancillary bandwidth detectors 146 and 154 communicate with each other using ancillary bandwidth measures 145 to determine the maximum data bandwidth (measured in bytes per second) that can be reliably communicated using ancillary data channel 38. If the user of the invention provides an optional ancillary bandwidth input 39, ancillary bandwidth detectors 146 and 154 will set ancillary bandwidth 147 equal to the optional ancillary bandwidth input 39 provided it is less than or equal to the maximum data bandwidth of ancillary data channel 38 as previously determined. If the user of the invention does not provide an optional ancillary bandwidth input 39, ancillary bandwidth detectors 146 and 154 will set ancillary bandwidth 147 equal to the maximum data bandwidth of ancillary data channel 38 as previously determined. The above process used for setting ancillary bandwidth 147 is normally performed at least once when the invention is first attached to video transmission system 3. Ancillary bandwidth detectors 146 and 154 may periodically monitor and update ancillary bandwidth 147 as needed.

Ancillary bandwidth 147 is sent to optimal filter controllers 142 and 155 and is used by them to determine optimal spatial filter control 22, temporal filter control 23, S×T filter control 24, and chroma filter control 25, which are themselves sent to programmable spatial activity filters (9, 14), programmable temporal activity filters (10, 15), programmable spatial×temporal activity filters (11, 16), and programmable chroma activity filters (12, 17), respectively. Controls (22, 23, 24, 25) are also sent to composite quality calculators 141 and 152 and used to synchronize the reception of parameters (137, 138, 139, 140) from parameter calculators (133, 134, 135, 136) and (148, 149, 150, 151), respectively. As ancillary bandwidth 147 is increased, optimal controllers 142 and 155 decrease the dimensions ($\Delta h \times \Delta v \times \Delta t$) of the spatial-temporal regions (see FIG. 8) that are used for extracting features, thereby enabling the invention to make finer measurements of video quality. Table 1 gives example ancillary bandwidths 147 that are required for transmitting spatial activity streams (26, 30), temporal activity streams (27, 31), S-T activity streams (28, 32), or chroma activity streams (29, 33) for several different combinations of horizontal-widths $\Delta h$ (75, 86, 97, or 120), vertical-widths $\Delta v$ (76, 87, 98, or 121), temporal widths $\Delta t$ (77, 88, 99, or 122) and sub-sampling factors. For the example ancillary bandwidths shown in Table 1, input video stream 1 and output video stream 4 are assumed to be video streams that contains a total of 640 horizontal pixels×480 vertical pixels× 30 frames per second and that a single feature (78, 89, 100, 110, or 123) extracted from one spatial-temporal region of the given dimension ($\Delta h \times \Delta v \times \Delta t$) requires 1 byte. When the sampling factor in Table 1 is 100%, optimal filter controllers 146 and 155 will output sampling controls (74, 85, 96, or 119) that contain all combinations of the i, j, and k indices. For this case, features (78, 89, 100 and 110, or 123) are extracted from every spatial-temporal region of the given dimensions ($\Delta h \times \Delta v \times \Delta t$). For sampling factors less than 100%, the preferred method is to generate sampling controls (74, 85, 96, or 119) that contain a randomly selected subset of all combinations of the i, j, and k indices. Other methods for generating the sampling controls may be used, including deterministic sub-sampling of the i, j, and k indices.

TABLE 1

Example Ancillary Bandwidths for Transmitting Activity Streams at Several Different Combinations of $\Delta h$, $\Delta v$, $\Delta t$, and Sampling Factors

| Ancillary Bandwidth (Bytes/s) | $\Delta h$ (pixels) | $\Delta v$ (pixels) | $\Delta t$ (frames) | Sampling Factor (%) |
| --- | --- | --- | --- | --- |
| 2 | 640 | 480 | 15 | 100 |
| 30 | 640 | 480 | 1 | 100 |
| 300 | 32 | 32 | 30 | 100 |
| 3000 | 32 | 32 | 3 | 100 |
| 3000 | 32 | 4 | 12 | 50 |
| 4800 | 8 | 8 | 30 | 100 |
| 36000 | 8 | 8 | 1 | 25 |
| 38400 | 2 | 2 | 6 | 10 |
| 96000 | 4 | 4 | 6 | 100 |
| 144000 | 8 | 8 | 1 | 100 |
| 384000 | 2 | 2 | 6 | 100 |
| 576000 | 4 | 4 | 1 | 100 |

The ancillary bandwidths given in Table 1 are meant as illustrative examples since the invention can be attached to input and output video streams (1, 4) with a wide range of horizontal, vertical, and temporal sampling resolutions, and the invention can choose the optimal spatial-temporal regions sizes ($\Delta h \times \Delta v \times \Delta t$) and sampling factors for a given ancillary bandwidth 147.

Given a particular ancillary bandwidth 147, the preferred method will now be presented for programming optimal filter controllers 142 and 155 to produce controls (22, 23, 24, 25), programming parameter calculators (133 and 148, 134 and 149, 135 and 150, 136 and 151) to produce parameters (137, 138, 139, 140, respectively), and programming video quality processors 34 and 36 to produce quality parameters 40 and composite score 41. The procedure given in FIG. 11 details this preferred method. A set of input video streams 156 is selected that is indicative of the input video streams 1 that are transmitted by video transmission system 3 during actual in-service operation. Preferably, all input video streams in the set of input video streams 156 should be at least 5 seconds in length. A set of video transmission systems 157 is also selected that is indicative of video transmission systems 3 used during actual in-service operation. Next, the set of input video streams 156 is injected into the set of video transmission systems 157 to produce the set of output video streams 158, where each individual output video stream from the set 158 corresponds to a particular input video stream from the set 156 and a particular video transmission system from the set 157. A subjective experiment 159 is performed that produces subjective differential mean opinion scores (DMOSs) 160, where each individual DMOS is indicative of the perceived difference in quality between a particular input video stream from the set 156 and a corresponding output video stream from the set 158, where the corresponding output video stream resulted from injecting the particular input video stream into one of the video transmission systems from the set 157. Preferably, quality judgment ratings from at least 15 different viewers should be averaged to produce subjective DMOSs 160.

For a particular ancillary bandwidth 147, allowable filter controls calculator 164 determines all sets of possible filter controls 165 such that each particular set of possible filter controls from sets of controls 165 will result in an aggregate bandwidth for compressed ancillary information 144 that will not exceed the desired ancillary bandwidth 147. In general, this process will result in many different possible combinations of spatial-temporal region sizes ($\Delta h$, $\Delta v$, $\Delta t$) and sampling controls for each of the programmable activity filters (9 and 14, 10 and 15, 11 and 16, 12 and 17). Parameter calculators 161 calculate a particular set of possible parameters from the sets of parameters 162 using a particular set of possible filter controls from sets of controls 165, the set of input video streams 156, and the corresponding set of output video streams 158. To properly generate the sets of possible parameters 162, parameter calculators 161 should perform input calibration like 8, output calibration like 13, and programmable activity filter calculations like (9 and 14, 10 and 15, 11 and 16, 12 and 17), and parameter calculations like (133 and 149, 135 and 150, 136 and 151). Thus, each particular set of possible parameters from the sets of parameters 162 may include calibration parameters (49, 66, 67, 68, 69), as well as spatial parameters 137, temporal parameters 138, S×T parameters 139, and chroma parameters 140 that have all been generated as previously described. In this manner, each particular set of possible parameters from sets of parameters 162 has associated subjective DMOSs 160.

Optimum parameter and composite score calculator 163 sorts through the sets of possible parameters 162 and produces a best set of quality parameters (p1, p2, ...) 40 and composite score (s) 41, based on how well these parameters 40 and score 41 correlate with their associated subjective DMOSs 160. Optimum parameter and composite score calculator 163 determines the best method of combining the individual gain or loss parameters from the (i, j, k) spatial-temporal regions of spatial parameters 137, temporal parameters 138, S×T parameters 139, and chroma parameters 140 to produce quality parameters (p1, p2, ...) 40 and composite score (s) 41. For this combinatorial step, the k temporal index should span the length of the input and output video streams that were observed in subjective experiment 159. The i horizontal and, vertical spatial indices should span the portion of the picture area that was observable in subjective experiment 159. Since quality decisions tend to be based on the worst impairment that is perceivable, this combinatorial step will preferably calculate worst case statistics for each of the parameters (137, 138, 139, 140). For example, a summation of the worst 0.2% spatial parameter loss$_{ratio}$(i, j, k) values over indices i, j, and k may be used. Other statistics may also be used for this combinatorial step (e.g., mean, standard deviation, median). In addition, it may be preferable to apply a non-linear mapping function after the combinatorial step to remove non-linear perceptual effects at the low and high ranges of parameter values. Optimum parameter and composite score calculator 163 examines all such resultant parameters from application of this combinatorial step and non-linear mapping to each set of possible parameters from the sets of parameters 162 and selects that set of quality parameters 40 with the highest correlation to subjective DMOSs 160.

Figure 12:
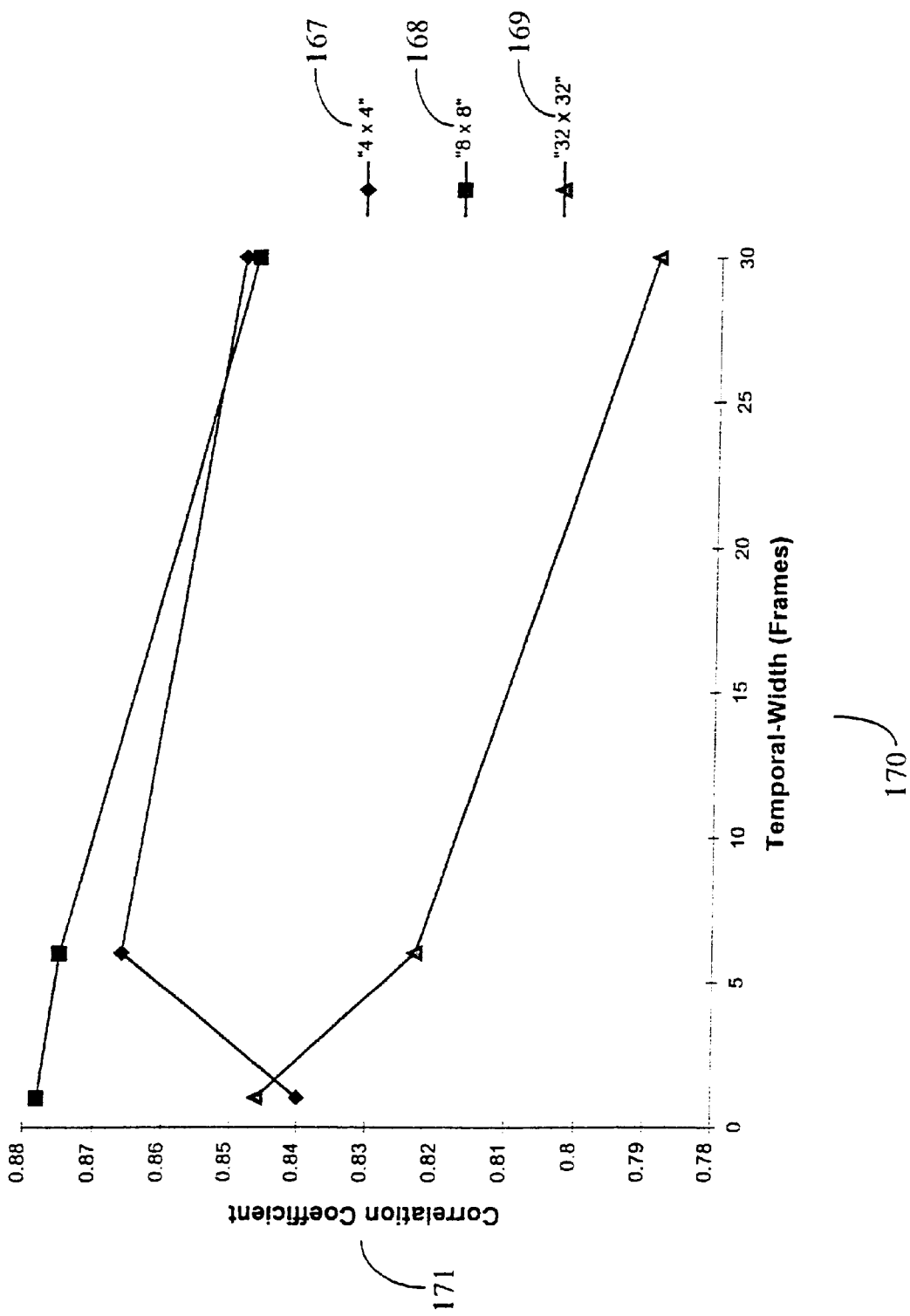
FIG. 12 demonstrates the selection criteria used to select one quality parameter that will be output by video quality processors in FIGS. 9 and 10, where this parameter is indicative of the observed change in video quality along some perceptual dimension for video scenes that are transmitted from the input to the output of the video transmission system.

FIG. 12 demonstrates the quality parameter and composite score selection process for an ancillary bandwidth 147 of 600,000 Bytes/s under the assumptions of Table 1 and for sets of possible parameters 162, where each set from the sets of possible parameters 162 comprise only one video quality parameter that measures a loss in spatial activity. The results plotted in FIG. 12 only considered a summation of the worst 0.2% spatial parameter loss$_{ratio}$(i, j, k) values over indices i, j, k for Δh×Δv sizes of 4×4 167, 8×8 168, and 32×32 169, temporal-widths 170 of 1, 6, and 30 frames, and 100% sampling factors. Normally, more spatial-temporal region sizes, sampling factors, parameter equation forms (e.g., loss$_{log}$), and combinatorial functions (e.g., worst 0.5%) would be examined, but FIG. 12 was intended to illustrate the selection process in the simplest possible manner. As can be seen in FIG. 12, the optimal parameter (p1) 40 that would be selected is the summation of the worst 0.2% spatial parameter loss$_{ratio}$(i, j, k) values where each individual loss$_{ratio}$(i, j, k) value is computed using a spatial-temporal region size (i.e., horizontal-width Δh 120×vertical-width Δv 121×temporal-width Δt 122 in FIG. 7) of 8 horizontal pixels×8 vertical pixels×1 frame. This parameter would be selected since it achieves the maximum correlation coefficient 171 (0.878 in FIG. 12) with subjective DMOSs 160, hence producing the most accurate objective measurement that is indicative of perception. In this case, since only one parameter is available to compute composite score (s) 41, optimum parameter and composite score calculator 163 will compute composite score (s) 41 using the equation that most closely maps quality parameter (p1) 40 values to subjective DMOSs 160. Preferably, this mapping process should utilize least squares fitting procedures. For example, if linear least squares fitting is used, composite score (s) 41 will be computed as $$s = c_0 + c_1 * p1$$

where $c_0$ and $c_1$ are constants that minimize the mean squared error between composite score (s) and subjective DMOSs 160. Other fitting procedures may also be used including the fitting of higher order polynomials and complex mathematical functions.

Figure 11:
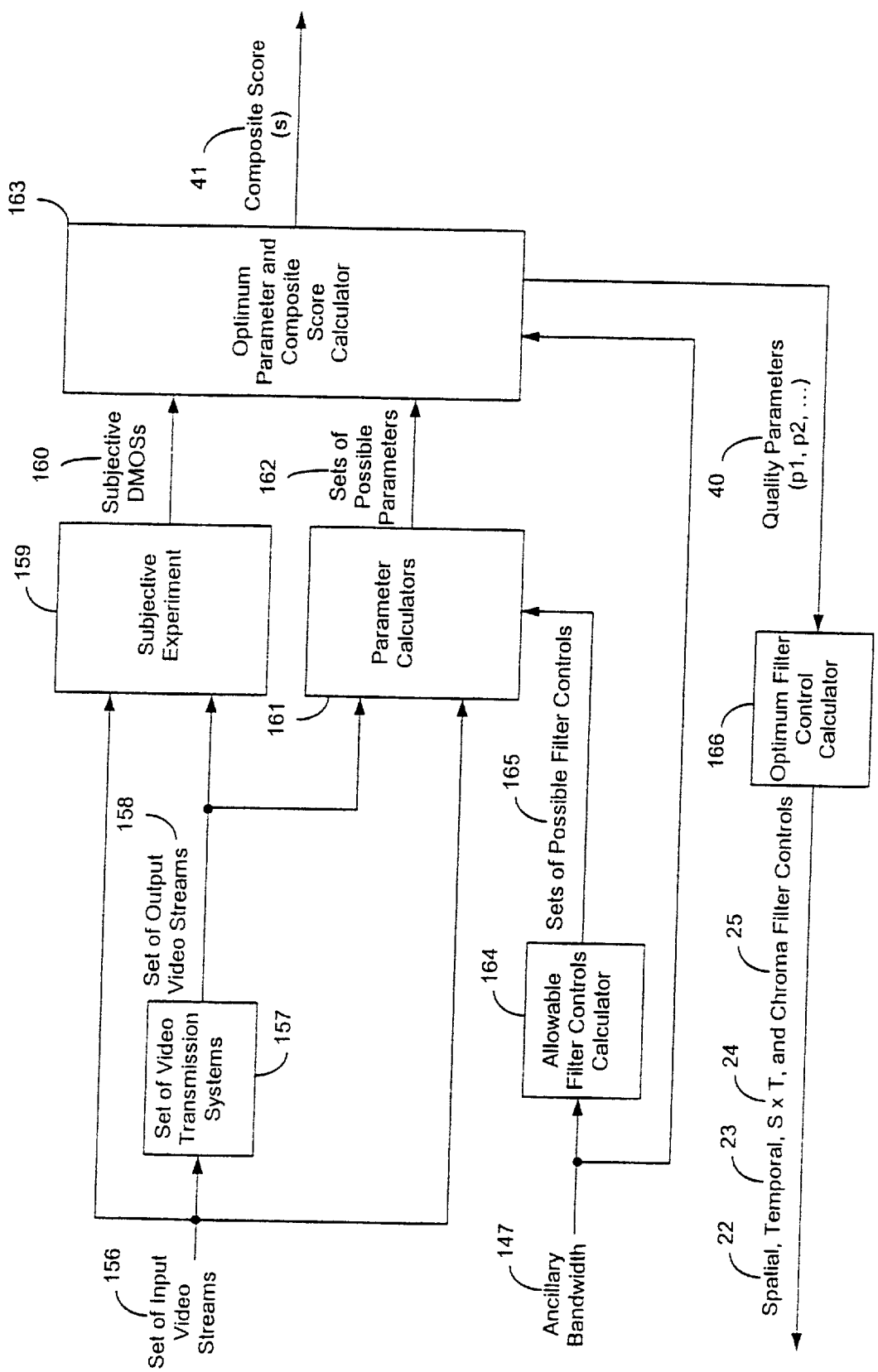
FIG. 11 demonstrates the process used to determine optimal filter controls for the programmable filters in FIG. 4, FIG. 5, FIG. 6, and FIG. 7, and optimal quality parameters/composite score for the video quality processors in FIGS. 9 and 10, based on the available ancillary data channel bandwidth.

If a particular set of possible parameters from the sets of parameters 162 includes more than one parameter, then optimum parameter and composite score calculator 163 first computes the best combination of all derived parameters in the particular set. For instance, if the particular set contains four parameters, p1 is derived from the first parameter (using one of the combinatorial steps previously described over the i, j, k indices), p2 is derived from the second parameter, p3 is derived from the third parameter, p4 is derived from the fourth parameter, and if linear fitting is used, composite score (s) is computed as $$s = c_0 + c_1 * p1 + c_2 * p2 + c_3 * p3 + c_4 * p4$$

for each combination of derived parameters p1, p2, p3, and p4, where $c_0$, $c_1$, $c_2$, $C_3$, and $C_4$ are constants that minimize the mean squared error between composite score (s) and subjective DMOSs 160. In this manner, the best fitting composite score (s) for each particular set from the sets of possible parameters 162 is calculated as that (s) which achieves the minimum mean squared error. The best fitting composite scores from all sets of possible parameters 162 are then examined, and the best overall composite score (s) and its quality parameters (p1, p2, ...) are selected as composite score (s) 41 and quality parameters (p1, p2, ...) 40 in FIG. 11. The means of generating composite score (s) 41 and quality parameters (p1, p2, ...) 40 are then used to program the operation of video quality processors 34 and 35 for ancillary bandwidth 147. The final selected quality parameters 40 in FIG. 11 are used by optimum filter control calculator 166 to calculate the required spatial (22), temporal (23), S×T (24), and chroma (25) filter controls for programming optimal filter controllers 142 and 155. The process described in FIG. 11 is then repeated for many different ancillary bandwidths 147 that might be used by the invention, thus programming quality processors 34 and 35 and optimal filter controllers 142 and 155 to operate for any desired ancillary bandwidth 147.

Preferably, the final selected set of quality parameters (p1, p2, ...) 40 should include at least one parameter from the set of spatial parameters 137, one parameter from the set of temporal parameters 138, one parameter from the set of S×T parameters 139, and one parameter from the set of chroma parameters 140. Depending upon the application for which video transmission system 3 is being used, the calibration parameters (49, 66, 67, 68, 69) may or may not be selected to be among quality parameters (p1, p2, . . . ) 40. For instance, video delay (d) 49 might be very important for assessing the quality of video transmission systems that are used for two-way communications (e.g., video teleconferencing) but not important for video transmission systems that are used for one-way transmission (e.g., television).

Figure 13:
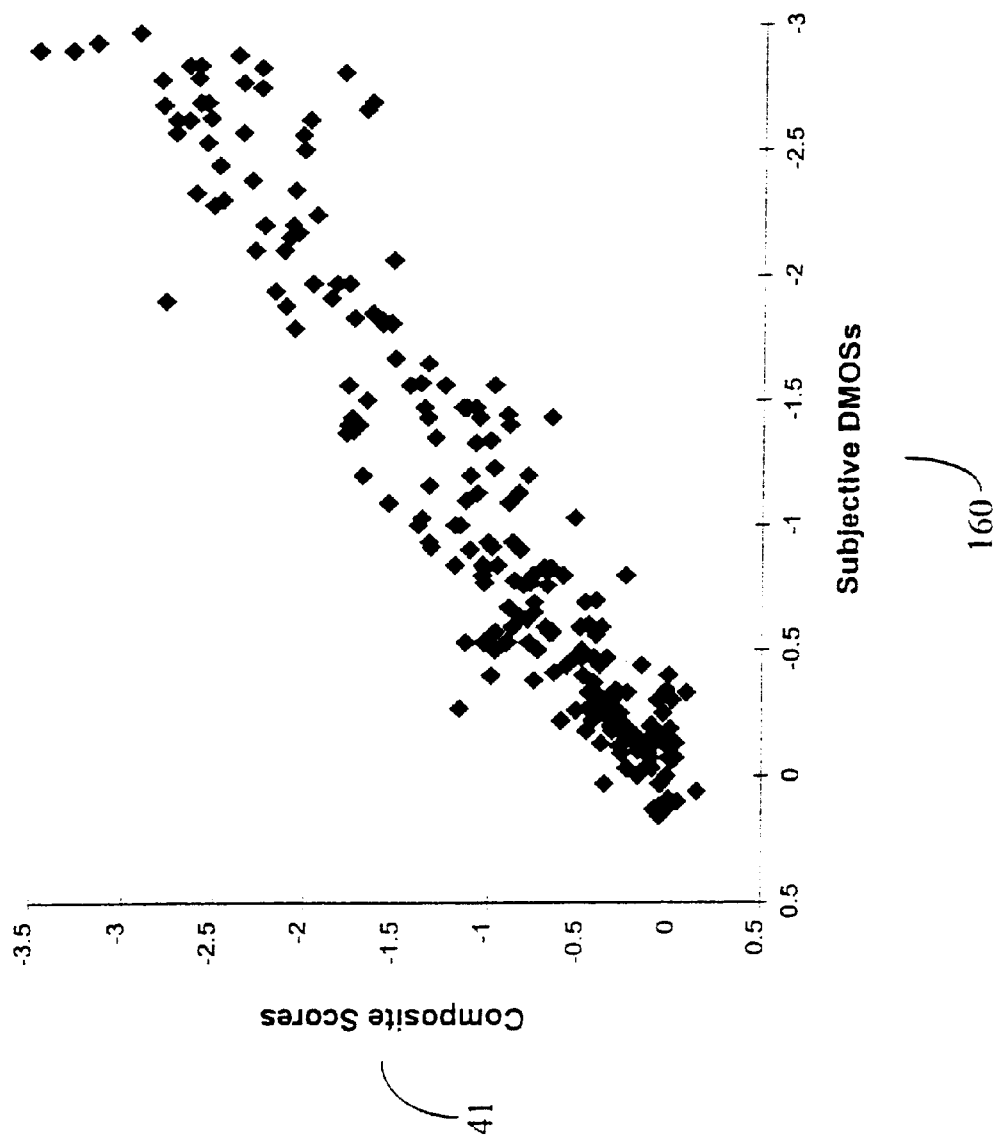
FIG. 13 demonstrates that the composite score output by the invention is indicative of the overall impression of the observed change in video quality for video scenes that are transmitted from the input to the output of the video transmission system.

FIG. 13 demonstrates that the composite score 41 output by the invention for one ancillary bandwidth is indicative of the overall impression of the observed change in video quality (i.e., subjective DMOSs 160 in FIG. 11) for video scenes that are transmitted from the input to the output of video transmission system 3. Each point in the scatter plot represents the quality of a particular input video stream through a particular video transmission system (i.e., scene× system combination). The coefficient of correlation between the composite score and the subjective DMOSs was 0.95. For FIG. 13, the ancillary bandwidth was approximately 600,000 Bytes/s and the set of video transmission systems (i.e., 157 in FIG. 11) included video transmission systems that utilized coding and decoding algorithms from the motion picture experts group (MPEG). The composite score (s) 41 in FIG. 13 used five quality parameters 40 that measured loss in spatial activity, gain in spatial-temporal activity, gain in chrominance activity, and loss in chrominance activity.

Figure 14:
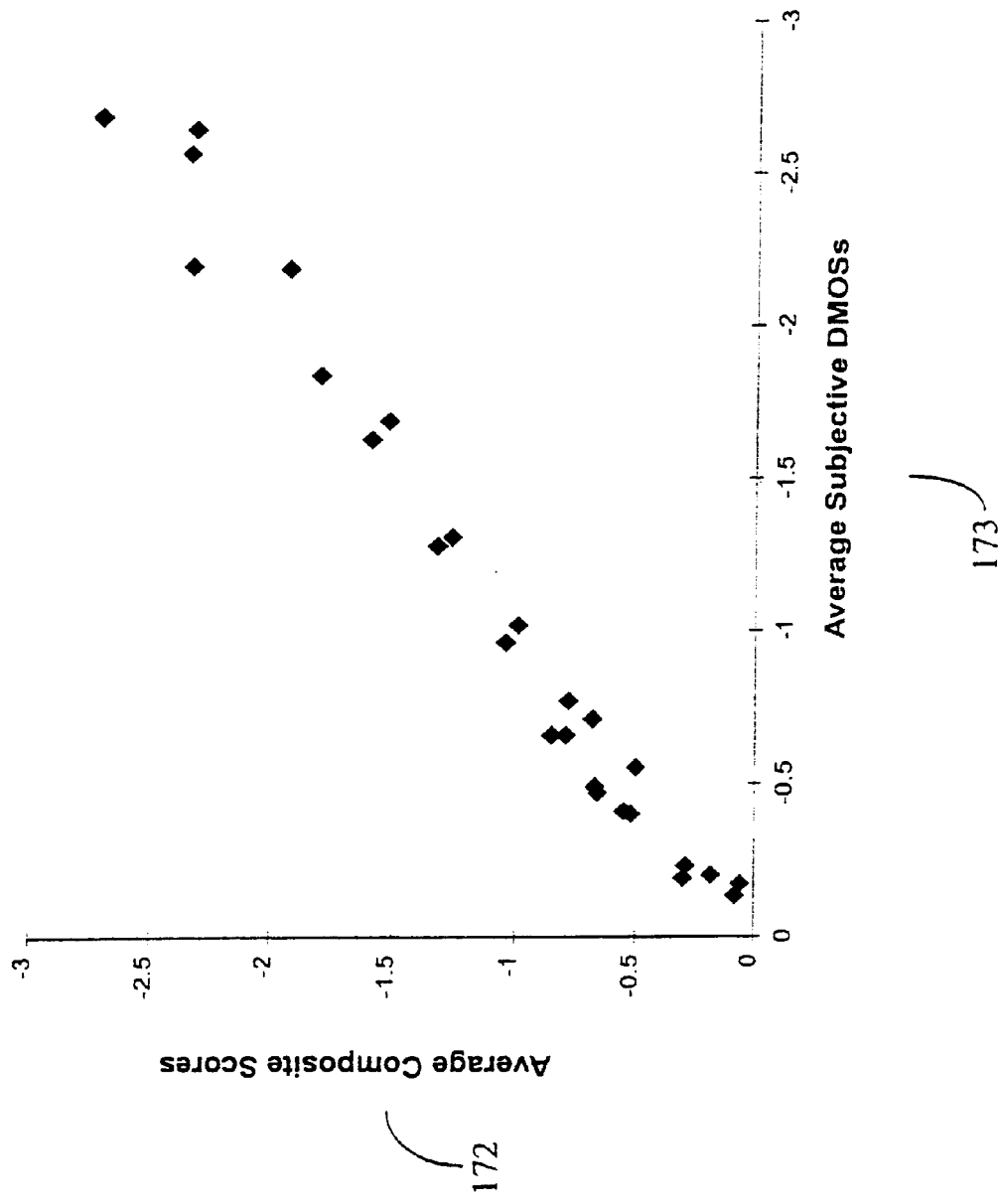
FIG. 14 demonstrates that averaging the composite scores produced by the invention is also indicative of human perception and relates to the averaged observed change in quality for a number of video scenes that are transmitted from the input to the output of the video transmission system.

FIG. 14 demonstrates that averaging the composite scores produced by the invention (i.e., shown as average composite scores 172) is also indicative of human perception and relates to the averaged observed change in quality (i.e., average subjective DMOSs 173) for a number of video scenes that are transmitted from the input to the output of the video transmission system. Here, each point in the scatter plot represents the average quality of a particular video system and was obtained by averaging the composite scores and the subjective DMOSs over all scenes that were injected into that particular system. The coefficient of correlation between the averaged composite scores 172 and the averaged subjective DMOSs 173 is 0.99.

Various modifications and alterations may be made to the embodiments of the present invention described and illustrated, within the scope of the present invention as defined by the following claims.

We claim:

1. A method of measuring in-service video quality of a video transmission system comprising the steps of:
   (a) extracting features from sequences of processed input and output video frames;
   (b) communicating the extracted features of the input video frames between an input and an output of an ancillary data channel;
   (c) computing individual video quality parameters from the extracted features which are indicative of perceptual dimensions of video quality;
   (d) calculating a plurality of composite video quality scores by combining sets of the individual quality parameters; and
   (e) selecting the set of video quality parameters having the highest video quality score, wherein
   the individual video quality parameters comprise an arithmetic product of spatial and temporal features of the input video frames and an arithmetic product of spatial and temporal features of the output video frames.

2. A method according to claim 1, wherein the individual quality parameters computed in step (c) further comprise at least one of spatial, temporal, color, brightness and contrast features.

3. A method according to claim 2, wherein the ancillary data channel has a variable bandwidth.

4. A method according to claim 3, further comprising determining the maximum data bandwidth of the ancillary data channel at least prior to communicating the extracted features in step (b).

5. A method according to claim 4, further comprising providing an ancillary bandwidth input; and
setting the bandwidth of the ancillary data channel equal to the ancillary bandwidth input if the ancillary bandwidth input is less than or equal to the maximum data bandwidth of the ancillary data channel.

6. A method according to claim 1, further comprising creating a copy of a video input stream and a video output stream;
coupling an input calibration processor and an output calibration processor nonintrusively to the copy of the video input stream and video output stream, respectively.

7. A method according to claim 6, wherein:
the input calibration processor
  1) estimates a video delay of the video transmission system; and
  2) produces a calibrated video input stream which is synchronized with the video output stream copy; and
the output calibration processor
  1) estimates gain, offset level, and spatial shift of the video transmission system; and
  2) produces a calibrated video output stream which is gain adjusted, level shifted, and spatially shifted to match the video input stream copy.

8. A method according to claim 7, wherein
the input calibration and output calibration is performed on image fields.

9. A method of measuring in-service video quality of a video transmission system, comprising:
extracting features from sequences of processed input and output video frames;
communicating the extracted features of the input video frames between an input and an output of an ancillary data channel;
computing individual video quality parameters from the extracted features which are indicative of perceptual dimensions of video quality;
calculating a plurality of composite video quality scores by combining sets of the individual quality parameters;
selecting the set of video quality parameters having the highest video quality score; and
determining the possible combination of dimensions ($\Delta h \times \Delta v \times \Delta t$) of the extracted features which do not exceed the lesser of:
  1) a bandwidth of the ancillary data channel; or
  2) the bandwidth of an ancillary bandwidth input.

10. A method according to claim 9, further comprising:
varying the dimensions ($\Delta h \times \Delta v \times \Delta t$) of the extracted features in an inverse proportion to a change in bandwidth size of the ancillary data channel.

11. An apparatus for in-service video quality measurement of a video transmission system, said apparatus comprising:
extracting means for extracting features from sequences of processed input and output video frames;
an ancillary data channel having an input and an output;
communicating means for communicating features of the input video frames extracted by said extracting means between the input and the output of said ancillary data channel;

computing means for computing individual quality parameters from the extracted features which are indicative of perceptual dimensions of video quality;

calculating means for calculating a plurality of composite video scores by combining sets of the individual quality parameters; and optimizing means for selecting the set of individual quality parameters having the highest video quality score, wherein the individual video quality parameters comprise an arithmetic product of spatial and temporal features of the input video frames and an arithmetic product of spatial and temporal features of the output video frames.

12. An apparatus according to claim 11, wherein said ancillary data channel has a variable bandwidth.

13. An apparatus according to claim 12, wherein said communicating means includes means for determining a maximum value of the bandwidth of said ancillary data channel.

14. An apparatus according to claim 13, further comprising:

an ancillary bandwidth input; and the bandwidth of said ancillary data channel is set equal to the bandwidth of said ancillary bandwidth input, if the bandwidth of said ancillary bandwidth input is less than or equal to the maximum value of the bandwidth of said ancillary data channel.

15. An apparatus according to claim 11, further comprising:

an input coupler and an output coupler;

said input coupler and said output coupler are coupled respectively to a video input stream and a video output stream to produce a copy of each video stream;

an input calibration processor, which is nonintrusively coupled to said input coupler; and an output calibration processor, which is nonintrusively coupled to said output coupler;

said input calibration processor and said output calibration processor process the copy of the video input stream and video output stream, respectively.

16. An apparatus according to claim 15, wherein said computing means includes a video quality processor.

17. An apparatus according to claim 16, wherein said input calibration processor and said output calibration processor process image fields.

18. An apparatus for in-service video quality measurement of a video transmission system, comprising:

an extracting means for extracting features from sequences of processed input and output video frames;

an ancillary data channel having an input and an output;

a communicating means for communicating features of the input video frames extracted by said extracting means between the input and the output of the ancillary data channel;

a computing means for computing individual quality parameters from the extracted features which are indicative of perceptual dimensions of video quality;

a calculating means for calculating a plurality of composite video scores by combinations of sets of the individual quality parameters; and an optimizing means for selecting the set of individual quality parameters having the highest video quality score, wherein said extracting means includes a means for changing a size of the dimensions ($\Delta h \times \Delta v \times \Delta t$) of features extracted by said extracting means which is inversely proportional to a bandwidth of said ancillary data channel.

19. An apparatus according to claim 18, wherein said computing means includes means for detecting individual quality parameters for at least one of spatial, temporal, color, spatial-temporal, brightness, and contrast.

20. An apparatus according to claim 19, wherein said extracting means includes means for determining a plurality of combinations of dimensions ($\Delta h \times \Delta v \times \Delta t$) of features extracted by said extracting means which do not exceed the lesser of:

1) the bandwidth of the ancillary data channel; or 2) the bandwidth of said ancillary bandwidth input.

* * * * *